(12) United States Patent
Moshfeghi

(10) Patent No.: US 10,505,681 B2
(45) Date of Patent: *Dec. 10, 2019

(54) METHOD AND SYSTEM FOR HIGH-THROUGHPUT AND LOW-POWER COMMUNICATION LINKS IN A DISTRIBUTED TRANSCEIVER NETWORK

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/616,911

(22) Filed: Jun. 7, 2017

(65) Prior Publication Data

US 2017/0338921 A1 Nov. 23, 2017

Related U.S. Application Data

(63) Continuation of application No. 14/709,136, filed on May 11, 2015, now Pat. No. 9,698,948, which is a
(Continued)

(51) Int. Cl.
*H04L 5/00* (2006.01)
*H04B 7/0408* (2017.01)
(Continued)

(52) U.S. Cl.
CPC ............ *H04L 5/0032* (2013.01); *H04B 1/40* (2013.01); *H04B 7/024* (2013.01); *H04B 7/043* (2013.01);
(Continued)

(58) Field of Classification Search
CPC ........ H04L 5/0032; H04L 27/12; H04W 4/80; H04W 24/08; H04W 72/0453;
(Continued)

(56) References Cited

U.S. PATENT DOCUMENTS 3,618,097 A 11/1971 McLeod, Jr.
5,525,990 A 6/1996 Lewis
(Continued)

FOREIGN PATENT DOCUMENTS

EP 1890441 A2 2/2008
EP 1890441 A3 3/2013
(Continued)

OTHER PUBLICATIONS

U.S. Appl. No. 15/706,759, filed Sep. 17, 2017, Moshfeghi, Mehran.
(Continued)

*Primary Examiner* — Edward F Urban
*Assistant Examiner* — Angelica M Perez
(74) *Attorney, Agent, or Firm* — Chip Law Group

(57) ABSTRACT

A device comprises a plurality of distributed transceivers, a plurality of distributed beamformers, a baseband processor, and a network management engine. The distributed transceivers perform beamforming in a radio frequency band. The distributed beamformers, however, performs beamforming in an intermediate frequency band. Each of the distributed transceivers is coupled to a corresponding one of the distributed beamformers. Each transceiver-beamformer pair is coupled to the baseband processor utilizing a same communication medium such as a cable. For transmission, a data stream generated at baseband is converted to intermediate frequencies. With a low-power transmission, the distributed beamformers transmit the data stream wirelessly in the intermediate frequencies to a receiving device. With a normal-power transmission, the distributed transceivers
(Continued)

transmit the data stream to the receiving device in the radio frequency band. The transceivers and the beamformers are turned OFF whenever not being used. A high-throughput communication link may be established through resource sharing.

26 Claims, 13 Drawing Sheets

Related U.S. Application Data continuation of application No. 13/473,083, filed on May 16, 2012, now Pat. No. 9,037,094.

(60) Provisional application No. 61/548,201, filed on Oct. 17, 2011.

(51) Int. Cl.

| | | |
|---|---|---|
| *H04B 7/0426* | (2017.01) | |
| *H04B 1/40* | (2015.01) | |
| *H04L 27/12* | (2006.01) | |
| *H04W 4/80* | (2018.01) | |
| *H04W 88/06* | (2009.01) | |
| *H04B 7/06* | (2006.01) | |
| *H04W 88/02* | (2009.01) | |
| *H04W 72/08* | (2009.01) | |
| *H04B 7/0413* | (2017.01) | |
| *H04B 7/08* | (2006.01) | |
| *H04W 24/08* | (2009.01) | |
| *H04W 72/04* | (2009.01) | |
| *H04B 7/024* | (2017.01) | |
| *H04W 84/12* | (2009.01) | |

(52) U.S. Cl.
CPC ......... *H04B 7/0408* (2013.01); *H04B 7/0413* (2013.01); *H04B 7/0689* (2013.01); *H04B 7/0897* (2013.01); *H04L 27/12* (2013.01); *H04W 4/80* (2018.02); *H04W 24/08* (2013.01); *H04W 72/046* (2013.01); *H04W 72/0453* (2013.01); *H04W 72/0473* (2013.01); *H04W 72/085* (2013.01); *H04W 88/02* (2013.01); *H04W 88/06* (2013.01); *H04W 84/12* (2013.01); *Y02D 70/00* (2018.01); *Y02D 70/122* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/22* (2018.01); *Y02D 70/444* (2018.01)

(58) Field of Classification Search
CPC ........... H04W 72/046; H04W 72/0473; H04W 72/085; H04W 88/02; H04W 88/06; H04W 84/12; H04B 1/40; H04B 7/024; H04B 7/0408; H04B 7/0413; H04B 7/043; H04B 7/0689; H04B 7/0897; Y02D 70/142; Y02D 70/146; Y02D 70/22; Y02D 70/00; Y02D 70/1262; Y02D 70/144; Y02D 70/122; Y02D 70/164; Y02D 70/444; Y02D 70/1242
USPC ........ 455/37.1, 101; 370/319–322, 335, 337, 370/342, 344, 348, 441, 442; 375/216, 375/219, 256, 267, 275, 229, 295, 347
See application file for complete search history.

(56) References Cited

U.S. PATENT DOCUMENTS

| | | |
|---|---|---|
| 5,561,850 A | 10/1996 | Makitalo et al. |
| 5,666,124 A | 9/1997 | Chethik et al. |
| 5,771,017 A | 6/1998 | Dean et al. |
| 5,936,577 A | 8/1999 | Shoki et al. |
| 6,018,316 A | 1/2000 | Rudish et al. |
| 6,307,502 B1 | 10/2001 | Marti-Canales et al. |
| 6,433,920 B1 | 8/2002 | Welch et al. |
| 6,456,252 B1 | 9/2002 | Goyette |
| 6,487,417 B1 | 11/2002 | Rossoni et al. |
| 6,600,776 B1 | 7/2003 | Alamouti et al. |
| 6,718,159 B1 | 4/2004 | Sato |
| 6,802,035 B2 | 10/2004 | Catreux et al. |
| 6,804,491 B1 | 10/2004 | Uesugi |
| 6,992,622 B1 | 1/2006 | Chiang et al. |
| 7,058,367 B1 | 6/2006 | Luo et al. |
| 7,187,949 B2 | 3/2007 | Chang et al. |
| 7,206,294 B2 | 4/2007 | Garahi et al. |
| 7,248,217 B2 * | 7/2007 | Mani ...................... H01Q 3/26 342/154 |
| 7,260,141 B2 * | 8/2007 | Bierly ...................... H01Q 3/26 375/222 |
| 7,333,455 B1 | 2/2008 | Bolt et al. |
| 7,339,979 B1 * | 3/2008 | Kelkar ................ H04B 7/0408 375/147 |
| 7,363,058 B2 | 4/2008 | Gustaf |
| 7,424,225 B1 | 9/2008 | Elliott |
| 7,574,236 B1 | 8/2009 | Mansour |
| 7,636,573 B2 | 12/2009 | Walton et al. |
| 7,688,909 B2 | 3/2010 | Tsutsui |
| 7,689,216 B2 | 3/2010 | Wandel |
| 7,710,319 B2 | 5/2010 | Nassiri-Toussi et al. |
| 7,890,114 B2 | 2/2011 | Braun et al. |
| 7,904,117 B2 | 3/2011 | Doan et al. |
| 7,911,985 B2 | 3/2011 | Proctor, Jr. et al. |
| 7,986,742 B2 | 7/2011 | Ketchum et al. |
| 8,098,752 B2 | 1/2012 | Hwang et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,175,184 B2 | 5/2012 | Kim et al. |
| 8,203,978 B2 | 6/2012 | Rodney et al. |
| 8,228,188 B2 | 7/2012 | Key et al. |
| 8,279,132 B2 | 10/2012 | Jung et al. |
| 8,280,445 B2 | 10/2012 | Yong et al. |
| 8,320,304 B2 | 11/2012 | Deb et al. |
| 8,364,188 B2 | 1/2013 | Deb et al. |
| 8,369,791 B2 | 2/2013 | Hafeez |
| 8,385,305 B1 | 2/2013 | Negus et al. |
| 8,385,452 B2 | 2/2013 | Gorokhov |
| 8,396,157 B2 | 3/2013 | Li et al. |
| 8,462,047 B1 | 6/2013 | Ai et al. |
| 8,482,462 B2 | 7/2013 | Komijani et al. |
| 8,570,988 B2 | 10/2013 | Wallace et al. |
| 8,620,301 B1 | 12/2013 | Hessel |
| 8,644,262 B1 | 2/2014 | Sun et al. |
| 8,654,815 B1 | 2/2014 | Forenza et al. |
| 8,750,264 B2 | 6/2014 | Shatti |
| 8,780,943 B2 | 7/2014 | Moshfeghi |
| 8,787,469 B2 | 7/2014 | Kim et al. |
| 8,817,678 B2 | 8/2014 | Moshfeghi |
| 8,854,255 B1 | 10/2014 | Ehret |
| 8,885,628 B2 | 11/2014 | Palanki et al. |
| 9,037,094 B2 * | 5/2015 | Moshfeghi ............ H04W 88/06 455/73 |
| 9,065,515 B2 | 6/2015 | Pezennec et al. |
| 9,112,648 B2 | 8/2015 | Moshfeghi |
| 9,185,601 B2 | 11/2015 | Frerking et al. |
| 9,197,982 B2 | 11/2015 | Moshfeghi |
| 9,225,482 B2 | 12/2015 | Moshfeghi |
| 9,226,092 B2 | 12/2015 | Moshfeghi |
| 9,253,587 B2 | 2/2016 | Moshfeghi |
| 9,438,389 B2 | 9/2016 | Moshfeghi et al. |
| 9,456,354 B2 | 9/2016 | Branlund |
| 9,548,805 B2 | 1/2017 | Moshfeghi et al. |
| 9,602,257 B2 | 3/2017 | Moshfeghi et al. |

(56) References Cited

U.S. PATENT DOCUMENTS

| | | |
|---|---|---|
| 9,660,777 B2 | 5/2017 | Moshfeghi et al. |
| 9,680,554 B2 | 6/2017 | Moshfeghi et al. |
| 9,686,060 B2 | 6/2017 | Moshfeghi |
| 9,698,948 B2* | 7/2017 | Moshfeghi ............ H04W 88/06 |
| 9,736,637 B2 | 8/2017 | Larsen et al. |
| 9,780,928 B2 | 10/2017 | Moshfeghi et al. |
| 9,787,103 B1 | 10/2017 | Leabman et al. |
| 9,829,563 B2 | 11/2017 | Xiao et al. |
| 9,923,620 B2 | 3/2018 | Moshfeghi et al. |
| 10,020,861 B2 | 7/2018 | Moshfeghi et al. |
| 10,069,555 B2 | 9/2018 | Islam et al. |
| 10,069,608 B2 | 9/2018 | Moshfeghi et al. |
| 10,084,576 B2 | 9/2018 | Moshfeghi et al. |
| 10,103,853 B2 | 10/2018 | Moshfeghi |
| 2002/0034958 A1 | 3/2002 | Oberschmidt et al. |
| 2002/0132600 A1 | 9/2002 | Rudrapatna |
| 2002/0193074 A1 | 12/2002 | Squibbs |
| 2002/0196186 A1 | 12/2002 | Holt |
| 2003/0012208 A1 | 1/2003 | Bernheim et al. |
| 2003/0125040 A1 | 7/2003 | Walton et al. |
| 2003/0129989 A1 | 7/2003 | Gholmieh et al. |
| 2003/0236109 A1 | 12/2003 | Nagata |
| 2004/0077354 A1 | 4/2004 | Leung et al. |
| 2004/0082356 A1 | 4/2004 | Rodney et al. |
| 2004/0095907 A1 | 5/2004 | Agee et al. |
| 2004/0110469 A1 | 6/2004 | Judd et al. |
| 2004/0116129 A1 | 6/2004 | Wilson |
| 2004/0127174 A1 | 7/2004 | Frank et al. |
| 2004/0166808 A1 | 8/2004 | Hasegawa et al. |
| 2005/0048964 A1 | 3/2005 | Cohen et al. |
| 2005/0069252 A1 | 3/2005 | Hwang et al. |
| 2005/0088358 A1 | 4/2005 | Larry et al. |
| 2005/0134517 A1 | 6/2005 | Gottl |
| 2005/0136943 A1 | 6/2005 | Banerjee et al. |
| 2005/0181755 A1 | 8/2005 | Hoshino et al. |
| 2005/0232216 A1 | 10/2005 | Webster et al. |
| 2005/0237971 A1 | 10/2005 | Skraparlis |
| 2005/0243756 A1 | 11/2005 | Cleveland et al. |
| 2005/0270227 A1 | 12/2005 | Stephens |
| 2006/0025178 A1 | 2/2006 | Tao et al. |
| 2006/0063494 A1 | 3/2006 | Zhang et al. |
| 2006/0121946 A1 | 6/2006 | Walton et al. |
| 2006/0246922 A1 | 11/2006 | Gasbarro et al. |
| 2006/0267839 A1 | 11/2006 | Vaskelainen et al. |
| 2007/0001924 A1 | 1/2007 | Hirabayashi |
| 2007/0040025 A1 | 2/2007 | Goel et al. |
| 2007/0052519 A1 | 3/2007 | Talty et al. |
| 2007/0066254 A1 | 3/2007 | Tsuchie et al. |
| 2007/0093270 A1 | 4/2007 | Lagnado |
| 2007/0100548 A1 | 5/2007 | Small |
| 2007/0116012 A1 | 5/2007 | Chang et al. |
| 2007/0280310 A1 | 12/2007 | Muenter et al. |
| 2008/0076370 A1 | 3/2008 | Kotecha et al. |
| 2008/0117961 A1 | 5/2008 | Han et al. |
| 2008/0166975 A1 | 7/2008 | Kim et al. |
| 2008/0212582 A1 | 9/2008 | Zwart et al. |
| 2008/0225758 A1 | 9/2008 | Proctor et al. |
| 2008/0258993 A1 | 10/2008 | Gummalla et al. |
| 2008/0261509 A1 | 10/2008 | Sen |
| 2008/0305820 A1 | 12/2008 | Sadiq et al. |
| 2008/0309555 A1 | 12/2008 | Fan et al. |
| 2008/0315944 A1 | 12/2008 | Brown |
| 2009/0029645 A1 | 1/2009 | Leroudier |
| 2009/0093265 A1 | 4/2009 | Kimura et al. |
| 2009/0156227 A1* | 6/2009 | Frerking .............. H04B 7/0691 455/455 |
| 2009/0161235 A1 | 6/2009 | Border et al. |
| 2009/0224137 A1 | 9/2009 | Hoermann |
| 2009/0233545 A1 | 9/2009 | Sutskover et al. |
| 2009/0325479 A1 | 12/2009 | Chakrabarti et al. |
| 2010/0080197 A1 | 4/2010 | Kanellakis et al. |
| 2010/0090898 A1* | 4/2010 | Gallagher ................ H01Q 3/26 342/373 |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 | 6/2010 | Rofougaran |
| 2010/0149039 A1 | 6/2010 | Komijani et al. |
| 2010/0167639 A1 | 7/2010 | Ranson et al. |
| 2010/0172309 A1 | 7/2010 | Forenza et al. |
| 2010/0208776 A1 | 8/2010 | Song et al. |
| 2010/0220012 A1 | 9/2010 | Reede |
| 2010/0273504 A1 | 10/2010 | Bull et al. |
| 2010/0291918 A1 | 11/2010 | Suzuki et al. |
| 2010/0304680 A1 | 12/2010 | Kuffner et al. |
| 2010/0304770 A1 | 12/2010 | Wieffeldt et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0045764 A1 | 2/2011 | Maruyama et al. |
| 2011/0063181 A1 | 3/2011 | Walker |
| 2011/0069773 A1 | 3/2011 | Doron et al. |
| 2011/0081875 A1 | 4/2011 | Imamura et al. |
| 2011/0105032 A1 | 5/2011 | Maruhashi et al. |
| 2011/0105167 A1 | 5/2011 | Pan et al. |
| 2011/0136478 A1 | 6/2011 | Trigui |
| 2011/0140954 A1 | 6/2011 | Fortuny-Guasch |
| 2011/0194504 A1 | 8/2011 | Gorokhov et al. |
| 2011/0212684 A1 | 9/2011 | Nam et al. |
| 2011/0222616 A1 | 9/2011 | Jiang et al. |
| 2011/0268037 A1 | 11/2011 | Fujimoto |
| 2011/0299441 A1 | 12/2011 | Petrovic et al. |
| 2012/0002742 A1 | 1/2012 | Cheng |
| 2012/0015603 A1 | 1/2012 | Proctor et al. |
| 2012/0034924 A1 | 2/2012 | Kalhan |
| 2012/0057508 A1 | 3/2012 | Moshfeghi |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083223 A1 | 4/2012 | Li et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0131650 A1 | 5/2012 | Gutt et al. |
| 2012/0149300 A1 | 6/2012 | Forster |
| 2012/0184203 A1 | 7/2012 | Tulino et al. |
| 2012/0184219 A1 | 7/2012 | Richardson et al. |
| 2012/0194385 A1 | 8/2012 | Schmidt et al. |
| 2012/0206299 A1 | 8/2012 | Valdes-Garcia |
| 2012/0230274 A1 | 9/2012 | Xiao et al. |
| 2012/0238202 A1 | 9/2012 | Kim et al. |
| 2012/0250659 A1 | 10/2012 | Sambhwani |
| 2012/0259547 A1 | 10/2012 | Morlock et al. |
| 2012/0314570 A1 | 12/2012 | Forenza et al. |
| 2013/0027240 A1 | 1/2013 | Chowdhury |
| 2013/0027250 A1 | 1/2013 | Chen |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0089123 A1 | 4/2013 | Rahul et al. |
| 2013/0094439 A1 | 4/2013 | Moshfeghi |
| 2013/0094440 A1 | 4/2013 | Moshfeghi |
| 2013/0094522 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1 | 4/2013 | Moshfeghi et al. |
| 2013/0114468 A1 | 5/2013 | Hui et al. |
| 2013/0155891 A1 | 6/2013 | Dinan |
| 2013/0272220 A1 | 10/2013 | Li et al. |
| 2013/0272437 A1 | 10/2013 | Eidson et al. |
| 2013/0286962 A1 | 10/2013 | Heath, Jr. et al. |
| 2013/0287139 A1 | 10/2013 | Zhu et al. |
| 2013/0322561 A1 | 12/2013 | Abreu et al. |
| 2013/0324055 A1 | 12/2013 | Kludt et al. |
| 2013/0343235 A1 | 12/2013 | Khan |
| 2014/0003338 A1 | 1/2014 | Rahul et al. |
| 2014/0010319 A1 | 1/2014 | Baik et al. |
| 2014/0016573 A1 | 1/2014 | Nuggehalli et al. |
| 2014/0035731 A1 | 2/2014 | Chan et al. |
| 2014/0044041 A1 | 2/2014 | Moshfeghi |

(56) References Cited

U.S. PATENT DOCUMENTS

| | | |
|---|---|---|
| 2014/0044042 A1 | 2/2014 | Moshfeghi |
| 2014/0044043 A1 | 2/2014 | Moshfeghi et al. |
| 2014/0045478 A1 | 2/2014 | Moshfeghi |
| 2014/0045541 A1 | 2/2014 | Moshfeghi et al. |
| 2014/0072078 A1 | 3/2014 | Sergeyev et al. |
| 2014/0086191 A1 | 3/2014 | Berntsen et al. |
| 2014/0133435 A1 | 5/2014 | Forenza et al. |
| 2014/0198696 A1 | 7/2014 | Li et al. |
| 2014/0241296 A1 | 8/2014 | Shattil |
| 2015/0003307 A1 | 1/2015 | Moshfeghi et al. |
| 2015/0011160 A1 | 1/2015 | Jurgovan et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0229133 A1 | 8/2015 | Reynolds et al. |
| 2015/0241020 A1 | 8/2015 | Lee et al. |
| 2015/0303950 A1 | 10/2015 | Shattil |
| 2015/0318897 A1 | 11/2015 | Hyde et al. |
| 2015/0318905 A1 | 11/2015 | Moshfeghi et al. |
| 2015/0341098 A1 | 11/2015 | Angeletti et al. |
| 2016/0014613 A1 | 1/2016 | Ponnampalam et al. |
| 2016/0043838 A1 | 2/2016 | Moshfeghi et al. |
| 2016/0054440 A1 | 2/2016 | Younis |
| 2016/0094092 A1 | 3/2016 | Davlantes et al. |
| 2016/0094318 A1 | 3/2016 | Shattil |
| 2016/0142114 A1 | 5/2016 | Moshfeghi et al. |
| 2016/0192400 A1 | 6/2016 | Sohn et al. |
| 2016/0197665 A1 | 7/2016 | Moshfeghi et al. |
| 2016/0203347 A1 | 7/2016 | Bartholomew et al. |
| 2016/0211905 A1 | 7/2016 | Moshfeghi et al. |
| 2016/0219567 A1 | 7/2016 | Gil et al. |
| 2016/0285481 A1 | 9/2016 | Cohen |
| 2017/0026218 A1 | 1/2017 | Shattil |
| 2017/0078897 A1 | 3/2017 | Duan et al. |
| 2017/0126374 A1 | 5/2017 | Moshfeghi et al. |
| 2017/0156069 A1 | 6/2017 | Moshfeghi et al. |
| 2017/0201437 A1 | 7/2017 | Balakrishnan et al. |
| 2017/0212208 A1 | 7/2017 | Baek et al. |
| 2017/0230099 A1 | 8/2017 | Moshfeghi et al. |
| 2017/0237290 A1 | 8/2017 | Bakker et al. |
| 2017/0257155 A1 | 9/2017 | Liang et al. |
| 2017/0279573 A1 | 9/2017 | Moshfeghi et al. |
| 2017/0288727 A1 | 10/2017 | Rappaport |
| 2017/0317734 A1 | 11/2017 | Moshfeghi |
| 2017/0317801 A1 | 11/2017 | Moshfeghi et al. |
| 2017/0324480 A1 | 11/2017 | Elmirghani et al. |
| 2017/0338921 A1 | 11/2017 | Moshfeghi |
| 2017/0339625 A1 | 11/2017 | Stapleton |
| 2018/0026586 A1 | 1/2018 | Carbone et al. |
| 2018/0048390 A1 | 2/2018 | Palmer et al. |
| 2018/0090992 A1 | 3/2018 | Shrivastava et al. |
| 2018/0091270 A1 | 3/2018 | Moshfeghi |
| 2018/0220416 A1 | 8/2018 | Islam et al. |
| 2018/0234158 A1 | 8/2018 | Moshfeghi |
| 2018/0375564 A1 | 12/2018 | Moshfeghi |
| 2019/0074942 A1 | 3/2019 | Moshfeghi |
| 2019/0089434 A1 | 3/2019 | Rainish et al. |
| 2019/0089501 A1 | 3/2019 | Moshfeghi |
| 2019/0097713 A1 | 3/2019 | Moshfeghi |
| 2019/0097770 A1 | 3/2019 | Moshfeghi |

FOREIGN PATENT DOCUMENTS

| | | | |
|---|---|---|---|
| WO | 2008027531 | A2 | 3/2008 |
| WO | 2012055468 | A1 | 5/2012 |
| WO | 2013058998 | A2 | 4/2013 |
| WO | 2013058999 | A2 | 4/2013 |
| WO | WO 2013/058998 | | 4/2013 |
| WO | WO 2013/058999 | | 4/2013 |
| WO | 2016115545 | A2 | 7/2016 |

OTHER PUBLICATIONS

U.S. Appl. No. 15/853,537, filed Dec. 22, 2017, Moshfeghi, Mehran.
Portions of prosecution history of U.S. Appl. No. 13/473,083, Apr. 17, 2015, Moshfeghi, Mehran.
Portions of prosecution history of U.S. Appl. No. 14/709,136, Jun. 1, 2017, Moshfeghi, Mehran.
Portions of prosecution history of U.S. Appl. No. 13/473,096, Jul. 20, 2015, Moshfeghi, Mehran.
Portions of prosecution history of U.S. Appl. No. 14/813,058, Feb. 17, 2017, Moshfeghi, Mehran.
Portions of prosecution history of U.S. Appl. No. 13/473,105, Jul. 30, 2014, Moshfeghi, Mehran.
Portions of prosecution history of U.S. Appl. No. 14/455,859, Aug. 12, 2016, Moshfeghi, Mehran.
Portions of prosecution history of U.S. Appl. No. 15/229,135, Dec. 21, 2017, Moshfeghi, Mehran.
Portions of prosecution history of U.S. Appl. No. 13/473,113, Nov. 24, 2015, Moshfeghi, Mehran.
Portions of prosecution history of U.S. Appl. No. 14/980,281, May 17, 2017, Moshfeghi, Mehran.
Portions of prosecution history of U.S. Appl. No. 15/595,940, Nov. 17, 2017, Moshfeghi, Mehran.
Portions of prosecution history of U.S. Appl. No. 13/473,160, Sep. 5, 2017, Moshfeghi, Mehran.
Portions of prosecution history of U.S. Appl. No. 13/473,144, Dec. 7, 2017, Moshfeghi, Mehran.
Portions of prosecution history of U.S. Appl. No. 15/853,537, Dec. 22, 2017, Moshfeghi, Mehran.
Portions of prosecution history of U.S. Appl. No. 13/473,180, Jun. 11, 2014, Moshfeghi, Mehran.
Portions of prosecution history of U.S. Appl. No. 14/325,218, Apr. 20, 2017, Moshfeghi, Mehran.
Portions of prosecution history of U.S. Appl. No. 15/472,148, Oct. 4, 2017, Moshfeghi, Mehran.
Portions of prosecution history of U.S. Appl. No. 13/919,958, Jan. 6, 2016, Moshfeghi, Mehran.
Portions of prosecution history of U.S. Appl. No. 13/919,932, Dec. 19, 2017, Moshfeghi, Mehran.
Portions of prosecution history of U.S. Appl. No. 13/919,967, Nov. 20, 2015, Moshfeghi, Mehran.
Portions of prosecution history of U.S. Appl. No. 14/980,338, Oct. 31, 2017, Moshfeghi, Mehran.
Portions of prosecution history of U.S. Appl. No. 13/919,922, Oct. 27, 2015, Moshfeghi, Mehran.
Portions of prosecution history of U.S. Appl. No. 14/940,130, May 4, 2017, Moshfeghi, Mehran.
Portions of prosecution history of U.S. Appl. No. 15/595,919, Nov. 9, 2017, Moshfeghi, Mehran.
Portions of prosecution history of U.S. Appl. No. 13/919,972, Dec. 20, 2016, Moshfeghi, Mehran.
Portions of prosecution history of U.S. Appl. No. 15/372,417, Jul. 28, 2017, Moshfeghi, Mehran.
International Search Report and Written Opinion of PCT/US2012/058839, dated Jan. 4, 2013, Golba LLC.
International Search Report and Written Opinion of PCT/US2012/058842, dated Jan. 4, 2013, Golba LLC.
U.S. Appl. No. 16/153,735, filed Oct. 6, 2018, Moshfeghi, Mehran.
U.S. Appl. No. 16/231,903, filed Dec. 24, 2018, Moshfeghi, Mehran.
U.S. Appl. No. 16/364,956, filed Mar. 26, 2019, Moshfeghi, Mehran.
U.S. Appl. No. 16/377,847, filed Apr. 8, 2019, Moshfeghi, Mehran.
U.S. Appl. No. 16/377,980, filed Apr. 8, 2019, Moshfeghi, Mehran.
U.S. Appl. No. 16/388,043, filed Apr. 18, 2019, Moshfeghi, Mehran.
Portions of prosecution history of U.S. Appl. No. 15/441,209, Mar. 28, 2019, Moshfeghi, Mehran.
Portions of prosecution history of U.S. Appl. No. 15/229,135, May 9, 2018, Moshfeghi, Mehran.
Portions of prosecution history of U.S. Appl. No. 16/125,757, Sep. 9, 2018, Moshfeghi, Mehran.
Portions of prosecution history of U.S. Appl. No. 15/595,940, Aug. 21, 2018, Moshfeghi, Mehran.
Portions of prosecution history of U.S. Appl. No. 16/101,044, Dec. 26, 2018, Moshfeghi, Mehran.
Portions of prosecution history of U.S. Appl. No. 15/706,759, Jan. 23, 2019, Moshfeghi, Mehran.

(56) References Cited

OTHER PUBLICATIONS

Portions of prosecution history of U.S. Appl. No. 16/129,413, Feb. 4, 2019, Moshfeghi, Mehran.
Portions of prosecution history of U.S. Appl. No. 13/473,144, Aug. 29, 2018, Moshfeghi, Mehran.
Portions of prosecution history of U.S. Appl. No. 15/853,537, Sep. 26, 2018, Moshfeghi, Mehran.
Portions of prosecution history of U.S. Appl. No. 15/472,148, Mar. 28, 2019, Moshfeghi, Mehran.
Portions of prosecution history of U.S. Appl. No. 13/919,932, Jun. 20, 2018, Moshfeghi, Mehran.
Portions of prosecution history of U.S. Appl. No. 16/016,619, Sep. 25, 2018, Moshfeghi, Mehran.
Portions of prosecution history of U.S. Appl. No. 14/980,338, Feb. 28, 2018, Moshfeghi, Mehran.
Portions of prosecution history of U.S. Appl. No. 15/893,626, Jun. 12, 2018, Moshfeghi, Mehran.
Portions of prosecution history of U.S. Appl. No. 16/129,423, Feb. 4, 2019, Moshfeghi, Mehran.
Portions of prosecution history of U.S. Appl. No. 15/372,417, Mar. 21, 2019, Moshfeghi, Mehran.
Non-Final Office Action for U.S. Appl. No. 16/016,619 dated Sep. 25, 2018.
Baggett, Benjamin M.W. Optimization of Aperiodically Spaced Phased Arrays for Wideband Applications. MS Thesis. Virginia Polytechnic Institute and State University, 2011 pp. 1-137.
Corrected Notice of Allowability for U.S. Appl. No. 15/904,521 dated May 6, 2019.
Corrected Notice of Allowance for U.S. Appl. No. 16/031,007 dated Jul. 8, 2019.
Corrected Notice of Allowance for U.S. Appl. No. 15/607,743 dated May 10, 2019.
Corrected Notice of Allowance for U.S. Appl. No. 15/904,521 dated Jun. 21, 2019.
Corrected Notice of Allowance for U.S. Appl. No. 15/904,521 dated May 10, 2019.
Corrected Notice of Allowance for U.S. Appl. No. 13/473,180 dated Jun. 11, 2014.
Corrected Notice of Allowance for U.S. Appl. No. 15/904,521.
Corrected Notice of Allowance for U.S. Appl. No. 16/031,007 dated Aug. 5, 2019.
Corrected Notice of Allowance in U.S. Appl. No. 15/607,743 dated Apr. 3, 2019.
Corrected Notice of Allowance in U.S. Appl. No. 15/835,971 dated Jul. 23, 2018.
Dennis R Morgan et al., "A same-frequency cellular repeater using adaptive feedback cancellation," Global Communications Conference (Globecom), 2012 IEEE, IEEE, (2012) XP032375270, pp. 3825-3830, 2012.
Ex Parte Quayle Action for U.S. Appl. No. 16/032,668 dated Jul. 10, 2019.
Examiner's Answer to Appeal Brief for U.S. Appl. No. 13/473,144 dated Jul. 26, 2017.
Examiner's Answer to Appeal Brief for U.S. Appl. No. 13/473,160 dated Dec. 24, 2015.
Examiner's Answer to Appeal Brief for U.S. Appl. No. 13/919,932 dated Jan. 10, 2017.
Final Office Action for U.S. Appl. No. 13/473,144 dated Jul. 28, 2016.
Final Office Action for U.S. Appl. No. 13/473/144 dated Aug. 14, 2014.
Final Office Action for U.S. Appl. No. 13/919,932 dated Oct. 23, 2015.
Final Office Action for U.S. Appl. No. 13/919,972 dated Jan. 21, 2016.
Final Office Action for U.S. Appl. No. 14/940,130 dated Oct. 14, 2016.
Final Office Action for U.S. Appl. No. dated Oct. 22, 2014.
International Preliminary Report on Patentability for International Patent PCT/US2012/058839, 5 pages, dated Apr. 22, 2014.
International Preliminary Report on Patentability for International Patent PCT/US2012/058839, dated Apr. 22, 2014.
International Preliminary Report on Patentability for International Patent PCT/US2012/058842, 5 pages, dated Apr. 22, 2014.
International Search Report and the Written Opinion of the International Searching Authority in International application No. PCT/US12/58842, 6 pages, dated Jan. 42013.
International Search Report and the Written Opinion of the International Searching Authority in International application No. PCT/US12/58839, 6 pages, dated Apr. 4, 2013.
International Search Report in PCT/US2018/064184 dated Jul. 1, 2019.
Invitation to Pay Additional Fees and, Where Applicable, Protest Fee, with Partial Search Report for PCT Appl No. PCT/US2018/064184 dated Apr. 10, 2019.
K. Han and K. Huang, "Wirelessly Powered Backscatter Communication networks: Modeling, Coverage and Capacity," Apr. 9, 2016, Arxiv.com.
List of References cited by Applicant and considered by Applicant for U.S. Appl. No. 14/325,218 dated Apr. 21, 2017.
Non-Final Office Action for U.S. Appl. No. 13/473,083 dated Mar. 3, 2014.
Non-Final Office Action for U.S. Appl. No. 13/473,096 dated Apr. 23, 2014.
Non-Final Office Action for U.S. Appl. No. 13/473,096 dated Dec. 9, 2013.
Non-Final Office Action for U.S. Appl. No. 13/473,096 dated Nov. 3, 2014.
Non-Final Office Action for U.S. Appl. No. 13/473,105 dated Nov. 25, 2013.
Non-Final Office Action for U.S. Appl. No. 13/473,113 dated Oct. 2, 2014.
Non-Final Office Action for U.S. Appl. No. 13/473,144 dated Feb. 6, 2014.
Non-Final Office Action for U.S. Appl. No. 13/473,144 dated Feb. 9, 2015.
Non-Final Office Action for U.S. Appl. No. 13/473,144 dated Oct. 7, 2015.
Non-Final Office Action for U.S. Appl. No. 13/473,160 dated Jan. 15, 2014.
Non-Final Office Action for U.S. Appl. No. 13/473,180 dated Sep. 12, 2013.
Non-Final Office Action for U.S. Appl. No. 13/919,922 dated Jan. 30, 2015.
Non-Final Office Action for U.S. Appl. No. 13/919,932 dated Feb. 6, 2015.
Non-Final Office Action for U.S. Appl. No. 13/919,958 dated Jan. 5, 2015.
Non-Final Office Action for U.S. Appl. No. 13/919,967 dated Feb. 9, 2015.
Non-Final Office Action for U.S. Appl. No. 13/919,972 dated Jun. 4, 2015.
Non-Final Office Action for U.S. Appl. No. 14/455,859 dated Nov. 13, 2015.
Non-Final Office Action for U.S. Appl. No. 14/709,136 dated Sep. 28, 2016.
Corrected Notice of Allowance for U.S. Appl. No. 16/031,007 dated Sep. 16, 2019.
Final Office Action for U.S. Appl. No. 16/129,413 dated Aug. 13, 2019.
Misc Communication from USPTO for U.S. Appl. No. 16/382,386 dated Oct. 8, 2019.
Non-Final Office Action for U.S. Appl. No. 16/231,903 dated Sep. 18, 2019.
Non-Final Office Action for U.S. Appl. No. 16/294,025 dated Sep. 12, 2019.
Non-Final Office Action for U.S. Appl. No. 16/377,980 dated Aug. 21, 2019.
Non-Final Office Action for U.S. Appl. No. 16/526,544 dated Sep. 18, 2019.
Notice of Allowance for U.S. Appl. No. 16/032,668 dated Sep. 20, 2019.

(56) References Cited

OTHER PUBLICATIONS

Notice of Allowance for U.S. Appl. No. 15/904,521 dated Sep. 20, 2019.
Notice of Allowance for U.S. Appl. No. 16/111,326 dated Oct. 10, 2019.
Patent Board Decision—Examiner Reversed for U.S. Appl. No. 13/919,932 dated Dec. 19, 2017.
Response to Rule 312 Communication for U.S. Appl. No. 15/834,894 dated Apr. 19, 2019; Miscellaneous Communication to Applicant for U.S. Appl. No. 15/834,894 dated Apr. 19, 2019.
Restriction Requirement for U.S. Appl. No. 15/893,626 dated Aug. 12, 2016.
Shimin Gong et al., "Backscatter Relay Communications Powered by Wireless Energy Beamforming," IEEE Trans. On Communication, 2018.
USPTO Miscellaneous communication for U.S. Appl. No. 15/834,894 dated Apr. 19, 2019.
Zeng et al., "Joint relay selection and beamforming for mmWave fronthauling network," 2017 IEEE/CIC International Conference on Communications in China, Oct. 22, 2017, 6 pages.
Non-Final Office Action for U.S. Appl. No. 14/813,058 dated Jun. 10, 2016.
Non-Final Office Action for U.S. Appl. No. 14/940,130 dated Apr. 6, 2016.
Non-Final Office Action for U.S. Appl. No. 14/980,281 dated Apr. 20, 2016.
Non-Final Office Action for U.S. Appl. No. 14/980,338 dated Mar. 14, 2017.
Non-Final Office Action for U.S. Appl. No. 15/229,135 dated Dec. 21, 2017.
Non-Final Office Action for U.S. Appl. No. 15/372,417 dated May 3, 2018.
Non-Final Office Action for U.S. Appl. No. 15/441,209 dated Jul. 3, 2018.
Non-Final Office Action for U.S. Appl. No. 15/595,940 dated Nov. 17, 2017.
Non-Final Office Action for U.S. Appl. No. 15/706,759 dated Jun. 12, 2018.
Non-Final Office Action for U.S. Appl. No. 15/893,626 dated Jun. 12, 2018.
Non-Final Office Action for U.S. Appl. No. 16/101,044 dated Dec. 26, 2018.
Non-Final Office Action for U.S. Appl. No. 16/125,757 dated Aug. 9, 2019.
Non-Final Office Action for U.S. Appl. No. 16/129,413 dated Feb. 4, 2019.
Non-Final Office Action for U.S. Appl. No. 16/129,423 dated Feb. 4, 2019.
Non-Final Office Action in U.S. Appl. No. 15/432,091 dated Nov. 22, 2017.
Non-Final Office Action in U.S. Appl. No. 16/111,326 dated Mar. 1, 2019.
Notice of Allowance for U.S. Appl. No. 13/473,083 dated Jan. 7, 2015.
Notice of Allowance for U.S. Appl. No. 13/473,096 dated Apr. 17, 2015.
Notice of Allowance for U.S. Appl. No. 13/473,105 dated Jun. 10, 2014.
Notice of Allowance for U.S. Appl. No. 13/473,113 dated Aug. 10, 2015.
Notice of Allowance for U.S. Appl. No. 13/473,160 dated May 25, 2017.
Notice of Allowance for U.S. Appl. No. 13/473,180 dated May 1, 2014.
Notice of Allowance for U.S. Appl. No. 13/919,922 dated Oct. 27, 2015.
Notice of Allowance for U.S. Appl. No. 13/919,932 dated Feb. 28, 2018.
Notice of Allowance for U.S. Appl. No. 13/919,958 dated Sep. 2, 2015.
Notice of Allowance for U.S. Appl. No. 13/919,967 dated Jul. 29, 2019.
Notice of Allowance for U.S. Appl. No. 13/919,972 dated Dec. 20, 2016.
Notice of Allowance for U.S. Appl. No. 14/325,218 dated Dec. 19, 2016.
Notice of Allowance for U.S. Appl. No. 14/455,859 dated Apr. 20, 2016.
Notice of Allowance for U.S. Appl. No. 14/709,136 dated Feb. 16, 2017.
Notice of Allowance for U.S. Appl. No. 14/813,058 dated Nov. 7, 2016.
Notice of Allowance for U.S. Appl. No. 14/940,130 dated Feb. 1, 2017.
Notice of Allowance for U.S. Appl. No. 14/980,281 dated Feb. 7, 2017.
Notice of Allowance for U.S. Appl. No. 14/980,338 dated Feb. 22, 2018.
Notice of Allowance for U.S. Appl. No. 15/229,135 dated May 22, 2018.
Notice of Allowance for U.S. Appl. No. 15/372,417 dated Dec. 7, 2018.
Notice of Allowance for U.S. Appl. No. 15/441,209 dated Dec. 28, 2018.
Notice of Allowance for U.S. Appl. No. 15/472,148 dated Dec. 10, 2018.
Notice of Allowance for U.S. Appl. No. 15/595,940 dated May 1, 2018.
Notice of Allowance for U.S. Appl. No. 16/129,423 dated Jul. 15, 2019.
Notice of Allowance for U.S. Appl. No. 16/382,386 dated Jul. 24, 2019.
Notice of Allowance for U.S. Appl. No. 16/031,007 dated May 2, 2019.
Notice of Allowance in U.S. Appl. No. 15/432,091 dated Apr. 11, 2018.
Notice of Allowance in U.S. Appl. No. 15/607,743 dated Jan. 22, 2019.
Notice of Allowance in U.S. Appl. No. 15/834,894 dated Feb 20, 2019.
Notice of Allowance in U.S. Appl. No. 15/835,971 dated May 29, 2018.
Notice of Allowance in U.S. Appl. No. 15/904,521 dated Mar. 20, 2019.
Notice of Allowance issued in U.S. Appl. No. 16/129,423 dated Jul. 15, 2019.
Patent Board Decision—Examiner Affirmed for U.S. Appl. No. 13/473,144 dated Jun. 4, 2018.
Patent Board Decision—Examiner Affirmed in Part for U.S. Appl. No. 13/473,160 dated Feb. 21, 2017.

\* cited by examiner

METHOD AND SYSTEM FOR HIGH-THROUGHPUT AND LOW-POWER COMMUNICATION LINKS IN A DISTRIBUTED TRANSCEIVER NETWORK

CROSS-REFERENCE TO RELATED APPLICATIONS/INCORPORATION BY REFERENCE

This patent application is a continuation application of U.S. patent application Ser. No. 14/709,136, filed May 11, 2015, published as U.S. Patent Publication 2015/0318905. U.S. patent application Ser. No. 14/709,136 is a continuation application of U.S. patent application Ser. No. 13/473,083, filed May 16, 2012, patented as U.S. Pat. No. 9,037,094. U.S. patent application Ser. No. 13/473,083, claims priority to and claims benefit from U.S. Provisional Patent Application Ser. No. 61/548,201 filed on Oct. 17, 2011. U.S. patent application Ser. No. 14/709,136 published as U.S. Patent Publication 2015/0318905 and U.S. patent application Ser. No. 13/473,083, patented as U.S. Pat. No. 9,037,094 are incorporated herein by reference.

This application makes reference to:
U.S. application Ser. No. 13/473,096, filed on May 16, 2012, now issued as U.S. Pat. No. 9,112,648;
U.S. application Ser. No. 13/473,144, filed on May 16, 2012, now published as U.S. Patent Publication 2013-0095747;
U.S. application Ser. No. 13/473,105, filed on May 16, 2012, now issued as U.S. Pat. No. 8,817,678;
U.S. application Ser. No. 13/473,160, filed on May 16, 2012, now issued as U.S. Pat. No. 9,780,928;
U.S. application Ser. No. 13/473,180, filed on May 16, 2012, now issued as U.S. Pat. No. 8,780,943;
U.S. application Ser. No. 13/473,113, filed on May 16, 2012, now issued as U.S. Pat. No. 9,225,482.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for high-throughput and low-power communication links in a distributed transceiver network.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for high-throughput and low-power communication links in a distributed transceiver network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for high-throughput and low-power communication links in a distributed transceiver network. In accordance with various exemplary embodiments of the invention, a device comprises a plurality of distributed transceivers, a plurality of distributed beamformers, a baseband processor, and a network management engine. The plurality of distributed transceivers may be operable to perform beamforming in a radio frequency band, and the plurality of distributed beamformers may perform beamforming in an intermediate frequency band. Each of the distributed transceivers is coupled to a corresponding one of the distributed beamformers. Each transceiver-beamformer pair may be connected to the baseband processor within the device utilizing the same communication medium such as cable. For transmission, the baseband processor may generate a data stream at baseband. Up-converters within the device may convert the data stream from baseband to one or more intermediate frequencies within the intermediate frequency band. The data stream in the intermediate frequencies may be routed to the distributed transceivers and the corresponding coupled distributed beamformers. With a low-power transmission, the device may be configured to utilize the distributed beamformers to transmit the data stream wirelessly in the intermediate frequencies to a receiving device. Each of the distributed beamformers may only perform beamforming and feeding of the data stream in the intermediate frequencies to corresponding antenna arrays for transmission without performing frequency up-conversion to a radio frequency. With a normal-power transmission, the device may be configured to utilize the distributed transceivers to transmit the data stream to the receiving device in the radio frequency band. In other word, the distributed transceivers may be operable to perform beamforming in the radio frequency band on the data stream during the normal-power transmission. The transceivers and the beamformers may be turned OFF to save power whenever they are not being used. A high-throughput communication link may be established between the device and the receiving device through resource sharing. For example, in instances when the device may have a low battery level, the device may first exploit available resources of an intermediate device, which may be within close proximity. The device may establish a high-throughput and low-power communication link using lower carrier frequencies to the intermediate device and to use the available processing and communication resources of the intermediate device to establish a link to more distant application devices such as gateways and/or access points.

Figure 1:
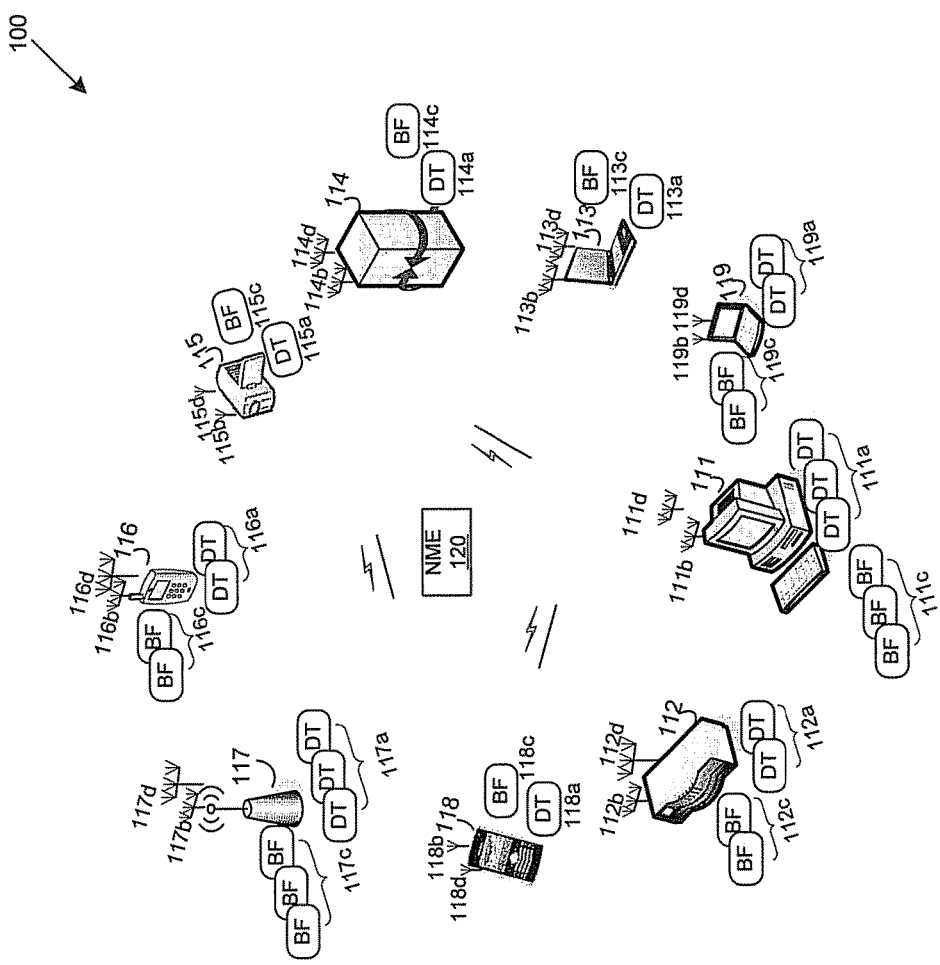
FIG. 1 is a block diagram illustrating an exemplary communication system that supports communication utilizing high-throughput and low-power communication links in a distributed transceiver network, in accordance with an embodiment of the invention.

FIG. 1 is a block diagram illustrating an exemplary communication system that supports communication utilizing high-throughput and low-power communication links in a distributed transceiver network, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data from one to another over wired and/or wireless connections. In an exemplary embodiment of the invention, each of the application devices 111-119 in the communication network 100 may comprise one or more distributed transceivers (DTs) and one or more beamformers for communication in the communication network 100. In various embodiments of the invention, the beamformers do not perform any additional carrier frequency translation from IF to RF carrier maintaining lower power by avoiding the power needed for the up-conversion/down-conversion, which is equivalent to having the same IF and RF carrier frequencies. In some embodiments, a beamformer module (referred throughout this disclosure) may be just a single antenna with no beamforming capability to further reduce power, cost, and device area. The distributed transceivers may be operable to perform beamforming in a radio frequency band, and the beamformers, however, may perform beamforming in intermediate frequencies. In telecommunication, a radio frequency band comprises a specific range of frequencies in the radio frequency (RF) spectrum. An intermediate frequency refers to a frequency to which a carrier frequency, also called a radio frequency, is shifted as an intermediate step in transmission or reception. An intermediate frequency band refers to a range of intermediate frequencies. In an exemplary embodiment of the invention, each of the distributed transceivers may be coupled to a corresponding one of the beamformers. For example, the distributed transceivers 111a through 119a and corresponding coupled beamformers 111c through 119c may be integrated in the application devices 111 through 119, respectively, and may be utilized for receiving and transmitting signals. Each distributed transceiver may be equipped with an independently configurable antenna or antenna array that is operable to transmit and receive signals over the air or wirelessly. Each of the beamformers may be equipped with an independently configurable antenna or antenna array that is operable to transmit and receive signals over the air or wirelessly. For example, the distributed transceivers 111a each may be equipped with an independently configurable antenna array 111b, and the distributed transceiver 118a, however, may be equipped with a single independently configurable antenna 118b to transmit and receive signals over the air or wirelessly. The beamformers 111c each may be equipped with an independently configurable antenna array 111d, and the beamformers 118c, however, may be equipped with a single independently configurable antenna 118d, the latter of which may be operable to transmit and receive signals over the air or wirelessly. Depending on device capabilities and user preferences, distributed transceivers and the corresponding coupled beamformers within the application device 111, for example, may comprise radios such as, for example, a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications.

In an exemplary operation, the distributed transceivers 111a through 119a and the corresponding coupled beamformers 111c through 119c in the communication network 100 are physically positioned and oriented at different locations within corresponding application devices such like laptop, TV, gateway and/or set-top box. The distributed transceivers 111a-19a and the corresponding coupled beamformers 111c-119c may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers and beamformers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire collection of the distributed transceivers 111a-119a and the corresponding coupled beamformers 111c-119c in the communication network 100 to optimize network performance. The application devices 111-119 each may operate in a transmission mode or in a receiving mode.

In an exemplary embodiment of the invention, in instances where the master application device 111 is transmitting multimedia information such as, for example, images, video, voice, as well as any other form of data to one or more receiving devices such as the end-user application devices 112-116, the network management engine 120 may be operable to configure the master application device 111 to transmit data in either a low-power transmit mode or a normal transmit mode, and at what transmit power levels. In the low-power transmit mode, the master application device 111 may be configured to utilize the beamformers 111c to transmit data and turn OFF the corresponding coupled distributed transceivers 111a to reduce power consumption. In the normal transmit mode, however, the master application device 111 may be configured to utilize the distributed transceivers 111a to transmit data and turn OFF the corresponding coupled beamformer 111c for power saving.

The network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application quality of service (QoS) requirements reported. The network management engine 120 may be operable to dynamically configure the distributed transceivers 111a-116a, the corresponding coupled beamformers 111c-116c, and associated antennas or antenna arrays 111b-116b and 111d-116d, and to coordinate and manage the operation of the distributed transceivers 111a-116a, the corresponding coupled beamformers 111c-116c, and associated antennas or antenna arrays 111b-116b and 111d-116d based on the collected communication environment information supplied from the end-user application devices 112-116. In this regard, the network management engine 120 may configure a single application device such as the application device 117 to maintain continuous connection with multiple different application devices such as the application devices 111-113. In some embodiments of the invention, the NME 120 may collect and/or identify whether the two ends of the link are in a very short-range vicinity and would want to establish a very high-throughput but short-range wireless link. The NME 120 may then use this information to rely more on activating beamformers (switching OFF full transceivers when possible) and choosing configurations that are optimal for this mode of operation. In this mode, transmit power levels are further reduced to save power consumption since the propagation loss will be substantially less in this mode.

The application device capabilities may comprise battery life, number of transceivers, number of antennas per transceiver, number of beamformers, number of antennas per beamformer, device interface types, maximum transmit power, processing protocols, service types, service classes and/or service requirements. The interface types for the application devices 111-119 may comprise access interface types such as, for example, Multimedia over Coax Alliance (MoCa), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as, for example, TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless.

Although communication among the application devices 111-119 with one or more distributed transceivers and corresponding coupled beamformers is illustrated in FIG. 1, the invention may not be so limited. Accordingly, an application device may be operable to utilize one or more associated distributed transceivers or corresponding coupled beamformers to communicate with one or more application devices with normal (undistributed) transceivers without departing from the spirit and scope of various embodiments of the invention.

Figure 2:
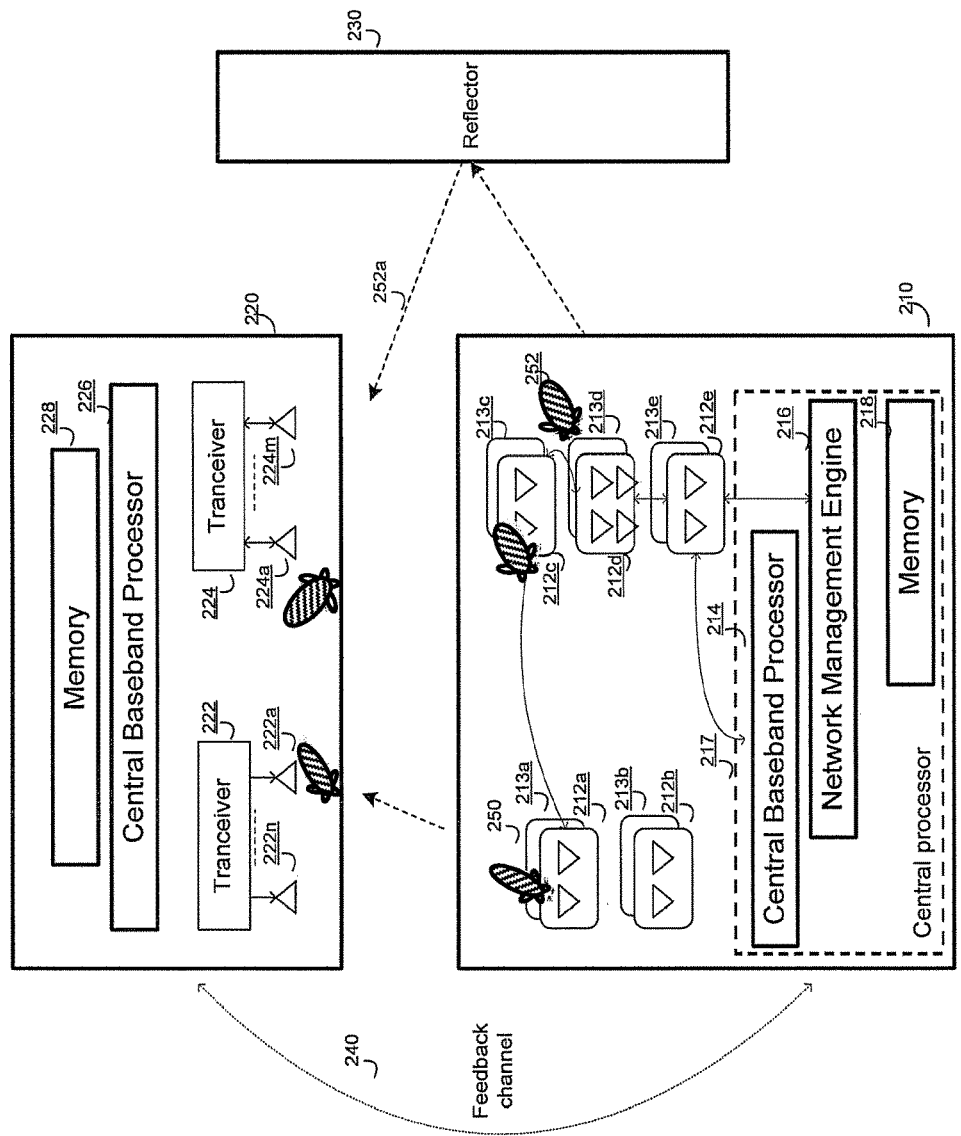
FIG. 2 is a diagram that illustrates an exemplary usage scenario where distributed transceivers and corresponding coupled beamformers are centrally managed to create a high-throughput and low-power communication link between a transmitting device and one receiving device, in accordance with an embodiment of the invention.

FIG. 2 is a diagram that illustrates an exemplary usage scenario where distributed transceivers and corresponding coupled beamformers are centrally managed to create a high-throughput and low-power communication link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as, for example, images, video, voice, as well as any other forms of data with one or more application devices such as the end-user application device 220. The master application device 210 may comprise a collection of distributed transceivers 212a through 212e, a collection of distributed beamformers 213a through 213e, and a central processor 217 that comprises a central baseband processor 214, a network management engine 216 and a memory 218. Each of the collection of distributed transceivers 212a through 212e may be coupled to a corresponding one of the distributed beamformers 213a through 213e. Each pair of the distributed transceivers 212a through 212e and the corresponding coupled distributed beamformers 213a through 213e may be coupled to the central processor 217 within the master application device 210 utilizing the same communication medium such as cable, for example, a coaxial cable.

In an exemplary embodiment of the invention, each pair of the distributed transceivers 212a through 212e and the corresponding coupled distributed beamformers 213a through 213e may be physically positioned and oriented at different locations within an application device such as, for example, a laptop, TV, gateway, and set-top box. In this regard, the distributed transceivers 212a-212e and the corresponding coupled distributed beamformers 213a-213e may be implemented in various ways such as, for example, a single distributed transceiver and a corresponding coupled distributed beamformer integrated in a single chip package; multiple silicon dies on one single chip; and multiple distributed transceivers on a single silicon die. Depending on device capabilities and user preferences, the distributed transceivers 212a-212e and the corresponding coupled distributed beamformers 213a through 213e may be oriented in a fixed direction or multiple different directions. In another exemplary embodiment of the invention, the collection of distributed transceivers 212a-212e and the collection of corresponding coupled distributed beamformers 213a through 213e may be operable to receive and/or transmit radio frequency signals from and/or to the end-user application device 220 using air interface protocols specified in UMTS, GSM, LTE, WLAN, 60 GHz/mmWave, and/or WiMAX, for example.

The central baseband processor 214 may comprise suitable logic, circuitry, interfaces and/or code that may be operable to perform baseband digital signal processing needed for transmission and receiving operation of the entire collection of distributed transceivers 212a through 212e and the corresponding coupled distributed beamformers 213a through 213e. For example, the central baseband processor 214 may be operable to perform waveform generation, equalization, and/or packet processing associated with the operation of the collection of distributed transceivers 212a through 212e and the corresponding coupled distributed beamformers 213a through 213e. In addition, the central baseband processor 224 may be operable to configure, manage and control orientations of the distributed transceivers 212a-212e and the corresponding coupled distributed beamformers 213a through 213e.

The network management engine 216 may comprise suitable logic, circuitry, interfaces and/or code that may be operable to monitor and collect communication environment information such as, for example, propagation environment conditions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers and/or beamformers that are activated, the number of application devices that are being communicated with, adding/dropping application devices to the communication network 100. In an exemplary embodiment of the invention, the network management engine 216 may be operable to configure a transmitting device such as the master application device 210 in the communication network 100 to transmit data in either a low-power transmit mode or a normal transmit mode. The network management engine 120 may determine transmit power levels for the master application device 210 (the transmitting device). The network management engine 120 may instruct or signal the master application device 210 in the low-power transmission mode to utilize the beamformers 213a through 213e to transmit data and turn OFF the corresponding coupled distributed transceivers 212a through 212e to reduce power consumption. The network management engine 216 may instruct or signal the master application device 210, which may be operating in the normal transmit mode, to utilize the one or more of the distributed transceivers 212a through 212e to transmit data and turn OFF the corresponding coupled beamformers 213a through 213e for power saving.

As shown in FIG. 2, the network management engine 216 may reside in the master application device 210. However, in some embodiments the network management engine 216 may reside on different network devices such as, for example, separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

In some embodiments of the invention, a single device, the master application device 210, the end-user application device 220, or the end-user application device 250, for example, may be configured to deploy a number of baseband processors to implement the system and data processing requirements/demands. For example, several baseband processors may be deployed within the single device to generate and/or decode different data streams transmitted/received by several distributed transceivers. In this configuration, the network management engine 216 may also be operable to control and coordinate the operation of the multiple baseband processors within the single device. In this regard, several internal connection topologies may be used or implemented. In some embodiments, each baseband processor in the single device may be dedicated to a subset of distributed transceivers and either ring/star topologies may be used. In this case, there may be no data transfer between the subsets of distributed transceivers. In another embodiment of the invention, the entire baseband processors and distributed transceivers within the single device may be connected together through a ring topology (using a single cable). In this case, the baseband processors within the single device may be coordinated to share the cable by time-multiplexing at the same IF frequency or frequency-multiplexing at different IF frequencies. The baseband processors within the single device may have different power/processing/communication characteristics. In some embodiments, one or more baseband processors that are most suitable for a mode of operation (e.g., lower power consumption meeting the throughput requirement) may be activated and other baseband processors may be disabled for power saving.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as, for example, flash memory and/or other suitable electronic data storage.

In an exemplary operation, a wireless link may be established between the master application device 210 and the end-user application device 220 through a reflector 230. U.S. application Ser. No. 13/473,096, which is filed on even date herewith discloses one or more reflectors that may be used to transmit one data stream or multiple data streams, and is hereby incorporated herein by reference in its entirety. In an exemplary embodiment of the invention, the network management engine 216 may be operable to establish a high-throughput and low-power communication link between the master application device 210 and the end-user application device 220 through resource sharing and the use of beamformers for data transmission. In this regard, the master application device 210 and the end-user application device 220 may utilize a low-throughput link such as a Bluetooth link to exchange information about actual available resources such as, for example, communication capabilities, processing and storage capabilities, battery capacities, and remaining power levels. The communication capacities may comprise number of transceivers, number of beamformers, and frequencies supported. The processing and storage capabilities may comprise the number of central processing units (CPUs), processing speed in Dhrystone Millions of Instructions per Second (DMIPS), speed, type and amount of Random Access Memory (RAM), and solid-state drive (SSD), and/or hard disk drive (HDD) capacities.

The master application device 210 and the end-user application device 220 may negotiate and determine resources available to be shared based on the respective actual resource information. The network management engine 216 may manage and allocate resources to establish the high-throughput and low-power communication link between the master application device 210 and the end-user application device 220. For example, the master application device 210 may comprise a dedicated piece of hardware that may accelerate audio, video, and image processing functions. In this regard, the end-user application device 220 may share or borrow the dedicated piece of hardware from the master application device 210 as a virtual hardware resource to accelerate audio, video, and image processing functions when needed.

In an exemplary embodiment of the invention, the network management engine 216 may determine or select which distributed transceivers and/or corresponding coupled beamformers within a transmitting device such as the master application device 210 may be utilized and at what transmit power levels. In this regard, the selected beamformers such as the beamformer 213a may perform beamforming and feeding of transmit signals in an IF frequency band directly to antennas for transmission over the air or wirelessly without performing frequency up-conversion. The use of the beamformers may enable the master application device 210 to transmit signals over the air or wirelessly in the IF band to the end-user application device 220, thereby resulting in significantly lower propagation loss compared to RF frequency propagation and saving power by avoiding frequency translation and inefficient power amplifiers operating in RF frequency. In an exemplary embodiment of the invention, the network management engine 216 may instruct or enable the central baseband processor 214 to selectively turn ON or OFF the distributed transceivers 212a-212e and the corresponding coupled beamformers 213a-213e for saving power. For example, in instances where the beamformers 213a-213e are selected or utilized to transmit data to the end-user application device 220, the network management engine 216 may instruct the central baseband processor 214 to turn ON the beamformers 213a-213e and turn OFF the corresponding coupled distributed transceivers 212a-212e to reduce power consumption.

Figure 3:
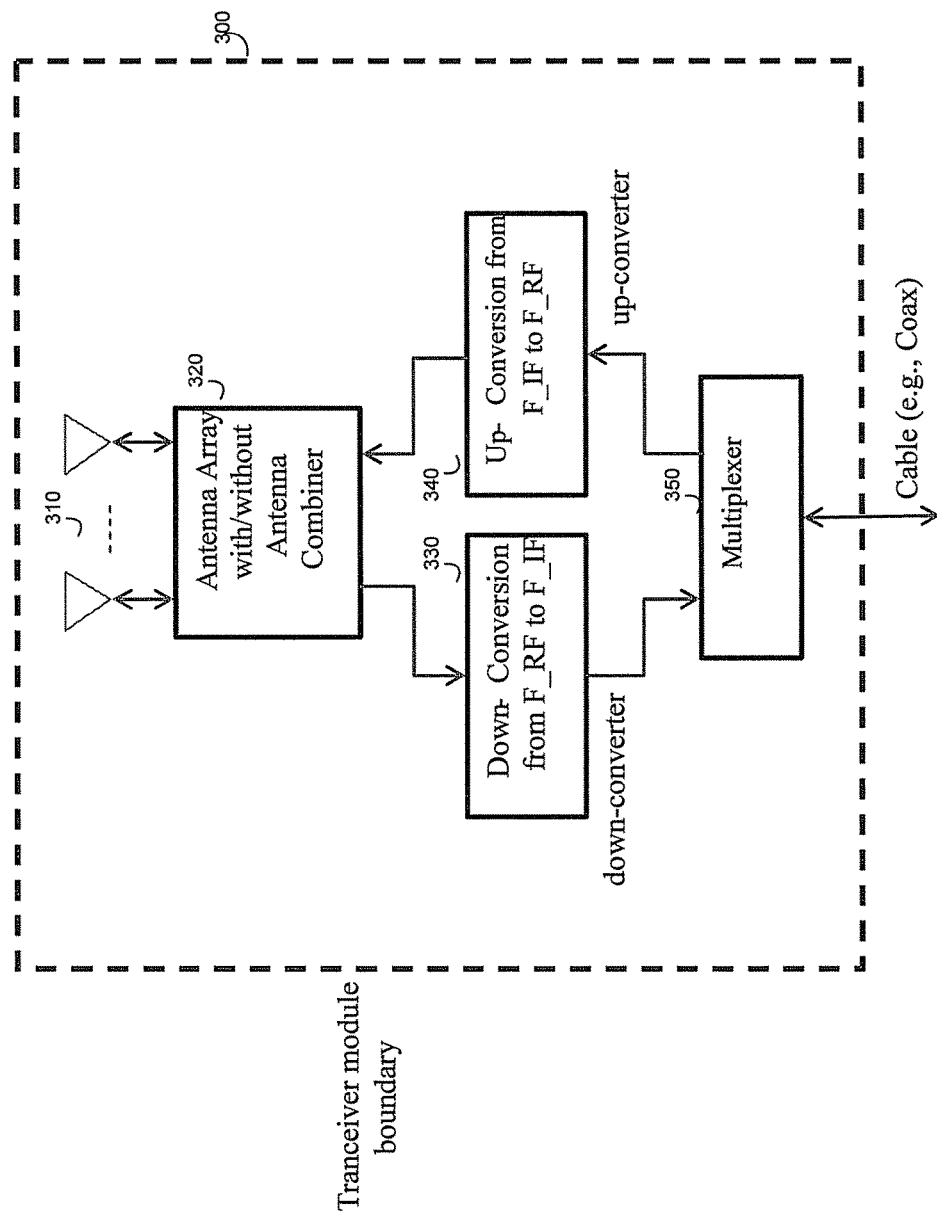
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, a down-converter 330, an up-converter 340, and a multiplexer 350.

In an exemplary operation, the antenna array 310 may comprise suitable logic, circuitry, interfaces and/or code that may be operable to transmit and receive radio frequency (RF) signals over the air or wirelessly. For transmission the transceiver 300 may be operable to receive a transmit signal from the central baseband processor 214. The transmit signal received from the central baseband processor 214 may be up-converted to RF frequency via the up-converter 340. For reception, the transceiver 300 may pass a receive signal from the antenna array 310 after frequency down-conversion via the down-converter 330 to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converter 330 and/or signals after the up-converter 340. For example, in transmission operation the signal provided by the up-converter 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converter 330 may comprise suitable logic, circuitry, interfaces and/or code that may be operable to translate a radio frequency (RF) received from the antenna array 310 to an intermediate-frequency (IF) signal during reception. The up-converter 340 may comprise suitable logic, circuitry, interfaces and/or code that may be operable to translate an intermediate-frequency (IF) signal of a corresponding baseband signal supplied from the central baseband processor 214, for example to a RF signal during transmission.

Figure 4:
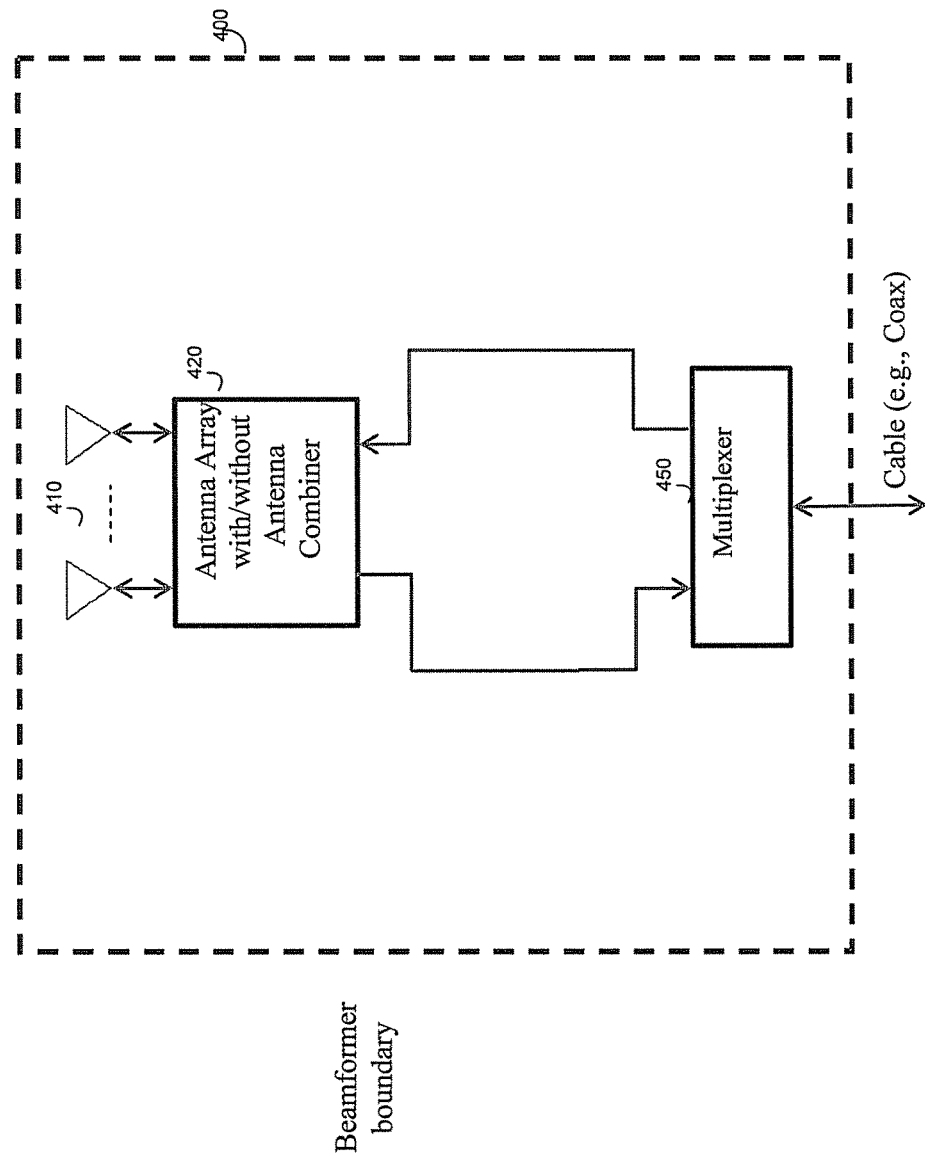
FIG. 4 is a diagram that illustrates an exemplary beamformer module, in accordance with an embodiment of the invention.

FIG. 4 is a diagram that illustrates an exemplary beamformer module, in accordance with an embodiment of the invention. Referring to FIG. 4, there is shown a beamformer 400 comprising an antenna array 410, an antenna array with/without antenna combiner 420, and a multiplexer 450. The multiplexer 450 may operate in substantially the same manner as the multiplexer 350 in FIG. 3.

In an exemplary operation, the antenna array 410 may comprise suitable logic, circuitry, interfaces and/or code that may be operable to transmit and receive intermediate frequency (IF) signals over the air or wirelessly. For transmission the beamformer 400 may be operable to receive a transmit signal in an IF band from the central processor 217. The transmit signal in the IF band may be directly fed to the antenna array 410 via the with/without antenna combiner 420 without performing frequency up-conversion. The antenna array with/without antenna combiner 420 may comprise suitable logic, circuitry, interfaces and/or code that may be operable to scale and/or phase-shift signals. For example, for transmission operation, the transmit signal in the IF band may be phase-shifted by the shifter by different values. The resulting phase-shifted signals in the IF band may be fed to different antenna elements within the antenna array 410.

In another embodiment of the invention, the antenna array 410 may be oriented in a fixed direction or multiple different directions depending on antenna types and user preferences. For example, the antenna array 410 may be implemented as a fixed directional antenna array to provide maximal directionality (with no explicit combiner). The same two modules, that is, the antenna array 410 and the antenna array with/without antenna combiner 420, may be correspondingly utilized in a reception operation for the beamformer 400. For reception, the beamformer 400 may pass a receive signal from the antenna array 410 directly to the central processor 217 without performing frequency down-conversion. In some embodiments of the invention, the master application device 210 may deploy beamformer modules, some with antenna arrays and some with fixed directional antennas. In low-power modes, the beamformers with directional antennas may be activated to further take advantage of lower power/complexity associated with directional antennas.

The multiplexer 450 may comprise suitable logic, circuitry, interfaces and/or code that may be operable to multiplex the transmit signal received from the central baseband processor 214 and the receive signal supplied from the antenna array 410. In this regard, the multiplexer 450 may utilize either time-division-multiplexing or frequency-domain-multiplexing to communicate the transmit signal and the receive signal over the same medium such as a cable. In an exemplary embodiment of the invention, the operation of the antenna array with/without antenna combiner 420 may be managed or programmed by the network management engine 216.

Figure 5:
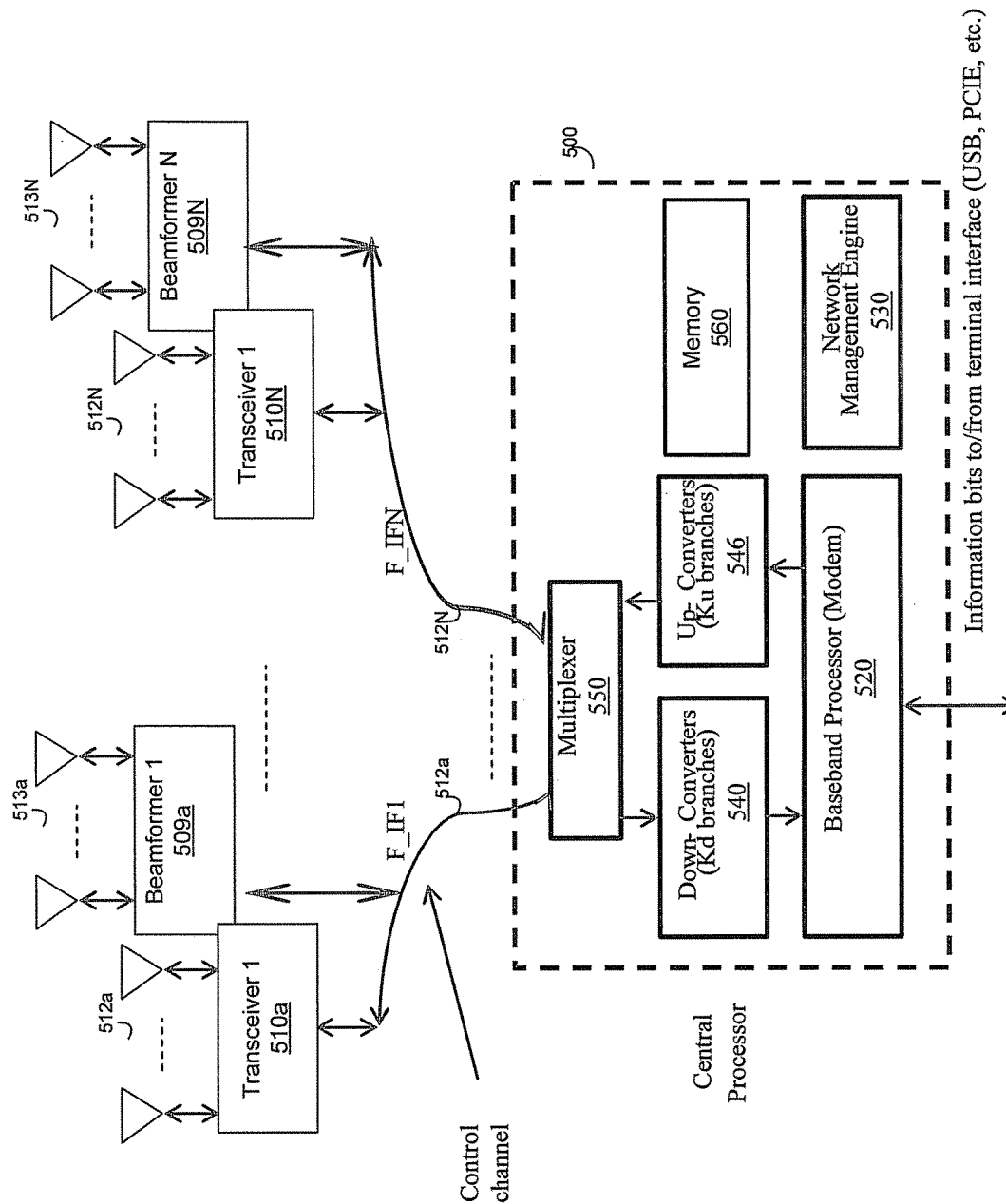
FIG. 5 is a diagram illustrating an exemplary master device with a collection of distributed transceivers and corresponding coupled beamformers that are implemented in a star topology, in accordance with an embodiment of the invention.

FIG. 5 is a diagram illustrating an exemplary master device with a collection of distributed transceivers and corresponding coupled beamformers that are implemented in a star topology, in accordance with an embodiment of the invention. Referring to FIG. 5, there is shown a central processor 500 that is connected to a collection of distributed transceivers 510*a*-510N and a collection of distributed beamformers 509*a*-509N. Each of the distributed transceivers 510*a*-510N may be coupled to a corresponding one of the distributed beamformers 509*a*-509N. Each pair of the distributed transceivers 510*a*-510N and the corresponding coupled distributed beamformers 509*a*-509N may be coupled to the central processor 500 utilizing the same communication medium such as cable, for example, a coaxial cable. As shown in FIG. 5, the distributed transceivers 510*a*-510N and the corresponding coupled distributed beamformers 509*a*-509N are connected to the central processor 500 in a star topology with direct separate cables from the central processor 500 to each pair of the distributed transceivers 510*a*-510N and the corresponding coupled distributed beamformers 509*a*-509N.

The central processor 500 comprises a baseband processor 520, a network management engine 530, down-converters 540, up-converters 546, a multiplexer 550 and a memory 560. The baseband processor 520 may comprise suitable logic, circuitry, interfaces and/or code that may be operable to provide MODEM functionality. In this regard, the central processor 500 may be operable to perform various baseband digital processing such as, for example, MIMO, OFDM, channel coding, HARQ, channel estimation and equalization, Timing/Carrier recovery and synchronization. The network management engine 530 may operate in substantially the same manner as the network management engine 216 in FIG. 2. During transmission, the baseband processor 520 may generate a baseband transmit signal. The up-converters 546 may translate the baseband transmit signal into a set of distinct intermediate frequencies, F_IF1, . . . , F_IFN. In an exemplary embodiment of the invention, the network management engine 530 may determine whether the distributed transceivers 510*a*-510N or the distributed beamformers 509*a*-509N may be utilized or selected and what transmit power levels should be utilized. In instances where the distributed beamformers 509*a*-509N are selected or utilized for transmission, the distributed beamformers 509*a*-509N may perform beamforming and feeding of the transmit signals in the intermediate frequencies, F_IF1, . . . , F_IFN, directly to the corresponding antenna arrays 513*a*-513N for transmission over the air or wirelessly without performing frequency up-conversion. In instances where the distributed transceivers 510*a*-510N are selected or utilized for transmission, the distributed transceivers 510*a*-510N may be operable to perform beamforming in a radio frequency band on the transmit signals for transmission. In this regard, the distributed transceivers 510*a*-510N may be operable to up-convert the transmit signals in the intermediate frequencies, F_IF1, . . . , F_IFN, into the radio frequency (RF). The distributed transceivers 510*a*-510N may perform beamforming on the RF signals. The resulting RF beams may be sent over the air or wirelessly through the antenna arrays 511*a*-511N, respectively.

For reception, the network management engine 530 may determine whether the distributed transceivers 510*a*-510N or the distributed beamformers 509*a*-509N may be utilized and what receive/transmit power levels should be utilized. In instances where the distributed beamformers 509*a*-509N are selected or utilized for receiving signals over the air or wirelessly, the distributed beamformers 509*a*-509N may perform beamforming and feeding of signals received from the antenna arrays 513*a*-513N directly to the central processor 500 without performing frequency down-conversion. In instances where the distributed transceivers 510*a*-510N are selected or utilized for receiving signals over the air or wirelessly, the distributed transceivers 510*a*-510N may be operable to down-convert the RF signals received from the antenna arrays 511*a*-511N to the intermediate frequencies, F_IF1, . . . , F_IFN, and pass the resulting IF signals to the central processor 500.

The multiplexer 550 may be responsible for multiplexing receive/transmit signals utilizing either time-division-multiplexing or frequency-domain-multiplexing. The memory 560 may comprise suitable logic, circuitry, interfaces and/or code that may be operable to store information such as executable instructions and data that may be utilized by the baseband processor 520 and/or other associated component units such as, for example, the network management engine 530. The memory 560 may comprise RAM, ROM, low latency nonvolatile memory such as, for example, flash memory and/or other suitable electronic data storage.

In an exemplary embodiment of the invention, a different control channel between the central processor 500 and each pair of the distributed transceivers 510a-510N and the corresponding coupled distributed beamformers 509a-509N may be utilized for configuring the transceiver or beamformer. As shown, control channels 512a through 512N are utilized for configuring and managing the corresponding pairs of the distributed transceivers 510a-510N and the corresponding coupled distributed beamformers 509a-509N, respectively.

In an exemplary embodiment of the invention, the distributed transceivers 510a-510N and the corresponding coupled distributed beamformers 509a-509N may operate in various modes such as, for example, spatial diversity mode, frequency diversity mode, multiplexing mode and multiple-input-multiple-output (MIMO) mode. In spatial diversity mode, the central baseband processing 520 may be operable to utilize the distributed transceivers 510a-510N or the corresponding coupled distributed beamformers 509a-509N to establish a spatial diversity link with intended end user device such as the end-user application device 220. For example, a portion of the distributed transceivers 510a-510N or the corresponding coupled distributed beamformers 509a-509N that may have strong propagation channel responses are activated and other transceivers and/or beamformers are switched OFF for power saving. In another example, the distributed transceivers 510a-510N or the corresponding coupled distributed beamformers 509a-509N may be arranged such that the master application device 210 (the transmitter) with available line of sight (LOS) towards the end-user device 220 (the receiver) may be configured to directly beam towards the receiver. In an exemplary embodiment of the invention, each active distributed transceiver or corresponding coupled distributed beamformer may communicate data streams utilizing the same final carrier frequency.

In the frequency diversity mode, the central baseband processing 520 may manage the distributed transceivers 510a-510N or the corresponding coupled distributed beamformers 509a-509N similar to spatial diversity mode except that each active distributed transceiver or corresponding coupled distributed beamformer may utilize a different final carrier frequency if such frequency spectrum channel is available. In multiplexing mode, the central baseband processing 520 may manage the distributed transceivers 510a-510N or the corresponding coupled distributed beamformers 509a-509N in such a way that different streams of data may be transmitted through different sets of the distributed transceivers 510a-510N or the corresponding coupled distributed beamformers 509a-509N. For example, in multiplexing mode, different distributed transceivers or beamformers may be dynamically programmed such that each transceiver's or beamformer's maximum pattern gain may be pointing to a different direction or reflector. As the environment changes (and hence the location of reflectors and end user unit change), the antenna pattern of the distributed transceivers 5410a-510N or the corresponding coupled distributed beamformers 509a-509N may be re-adjusted. In MIMO mode, the central baseband processing 520 may manage the distributed transceivers 510a-510N or the corresponding coupled distributed beamformers 509a-509N in such a way that different streams of data may be transmitted through different sets of the distributed transceivers 510a-510N or the corresponding coupled distributed beamformers 509a-509N to a single receiver device such as the end-user application device 220.

In an exemplary embodiment of the invention, the distributed transceivers 510a-510N or the corresponding coupled distributed beamformers 509a-509N may be configured to switch between spatial diversity mode, frequency diversity mode, multiplexing mode and multiple-input-multiple-output (MIMO) mode based on corresponding propagation environment conditions, link quality, device capabilities, device locations, usage of resources, resource availability, target throughput, application QoS requirements. In some embodiments of the invention, the application device in FIG. 5 may implement decoupled connections to corresponding transceivers and beamformers. This may allow the central baseband processor 520 to supply different data streams to each transceiver and beamformer. In this embodiment of the invention, the central baseband processor 520 and the NME 530 may utilize and activate the transceivers and beamformers concurrently to meet very high throughput demands.

In some embodiments of the invention, the interface between the central baseband processor 520 and the distributed transceivers 510a through 510N and the distributed beamformers 509a-509N may be different than an analog IF connection. In an exemplary case, the distributed transceivers 510a through 510N may comprise analog-to-digital-converters (ADCs) and digital-to-analog-converters (DACs). In this case, a transceiver such as the distributed transceiver 510a may receive digital bits from the central baseband processors 520 through a digital link and use its internal DAC to generate an analog waveform and then to perform the frequency up-conversion and beamforming steps for transmission. Similarly, a transceiver such as the distributed transceiver 510a may receive an RF waveform, down-convert it, and then use its internal ADC to digitize the waveform and send the digital bits over a digital connection/cable to the baseband processor 520. In other embodiments of the invention, the distributed transceivers 510a through 510N may comprise multiple digital processing blocks or units. In this case, a portion of processing within the central baseband processor 520 may be moved (in terms of partitioning) to inside the transceivers boundary. In the above embodiments, one or more digital connections or interfaces between the central baseband processor 520 and the distributed transceivers 510a through 510N may be implemented or deployed. The digital connections/interfaces may comprise Ethernet and various memory bus protocols.

Figure 6:
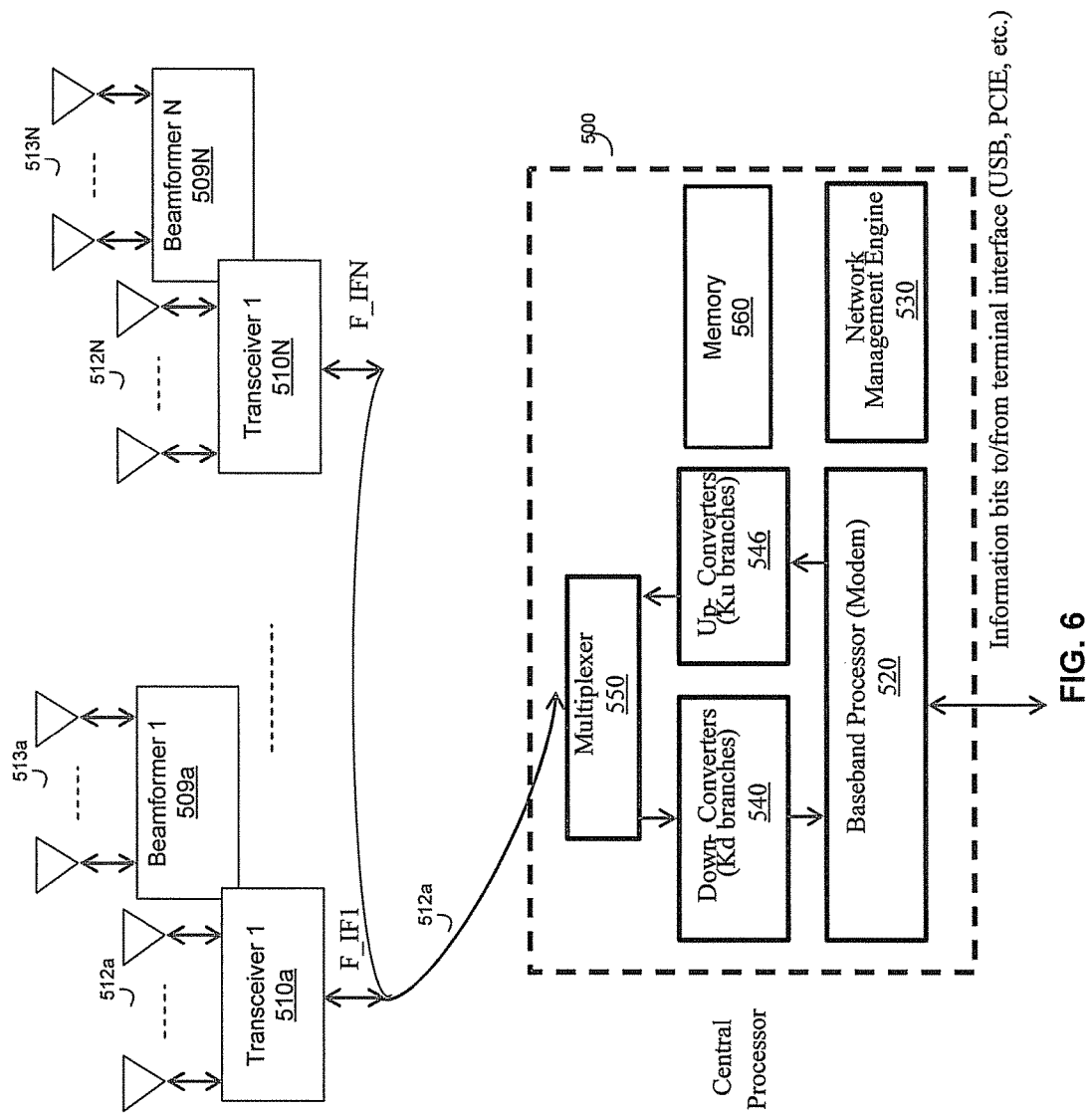
FIG. 6 is a diagram illustrating an exemplary master device with a collection of distributed transceivers and corresponding coupled beamformers that are implemented in a ring topology, in accordance with an embodiment of the invention.

FIG. 6 is a diagram illustrating an exemplary master device with a collection of distributed transceivers and corresponding coupled beamformers that are implemented in a ring topology, in accordance with an embodiment of the invention. As shown, the distributed transceivers 510a-510N and the corresponding coupled distributed beamformers 509a-509N are connected to the central processor 500 in a ring topology with a single direct cable from the central processor 500 to each pair of the collection of the distributed transceivers 510a-510N and the beamformers 509a-509N. In this regard, a single control channel between the baseband processer 520 and each pair of the distributed transceivers 510a-510N and the corresponding coupled distributed beamformers 509a-509N may be utilized for configuring the entire distributed transceivers 510a-510N and the corresponding coupled distributed beamformers 509a-509N as needed. In this embodiment of the invention, the same cable 512a may be utilized to transport different data streams multiplexed over different IF frequencies. The intended transceivers and beamformers may be operable to selectively tune to their corresponding IF frequencies to recover their intended stream and filter out other data streams.

In some embodiments of the invention, the cable connection 512a between the central processor 500 and the distributed transceivers 510a through 510N may be substituted with an optical connection, printed-board connection, Ethernet cable, or another wireless connection.

Figure 7:
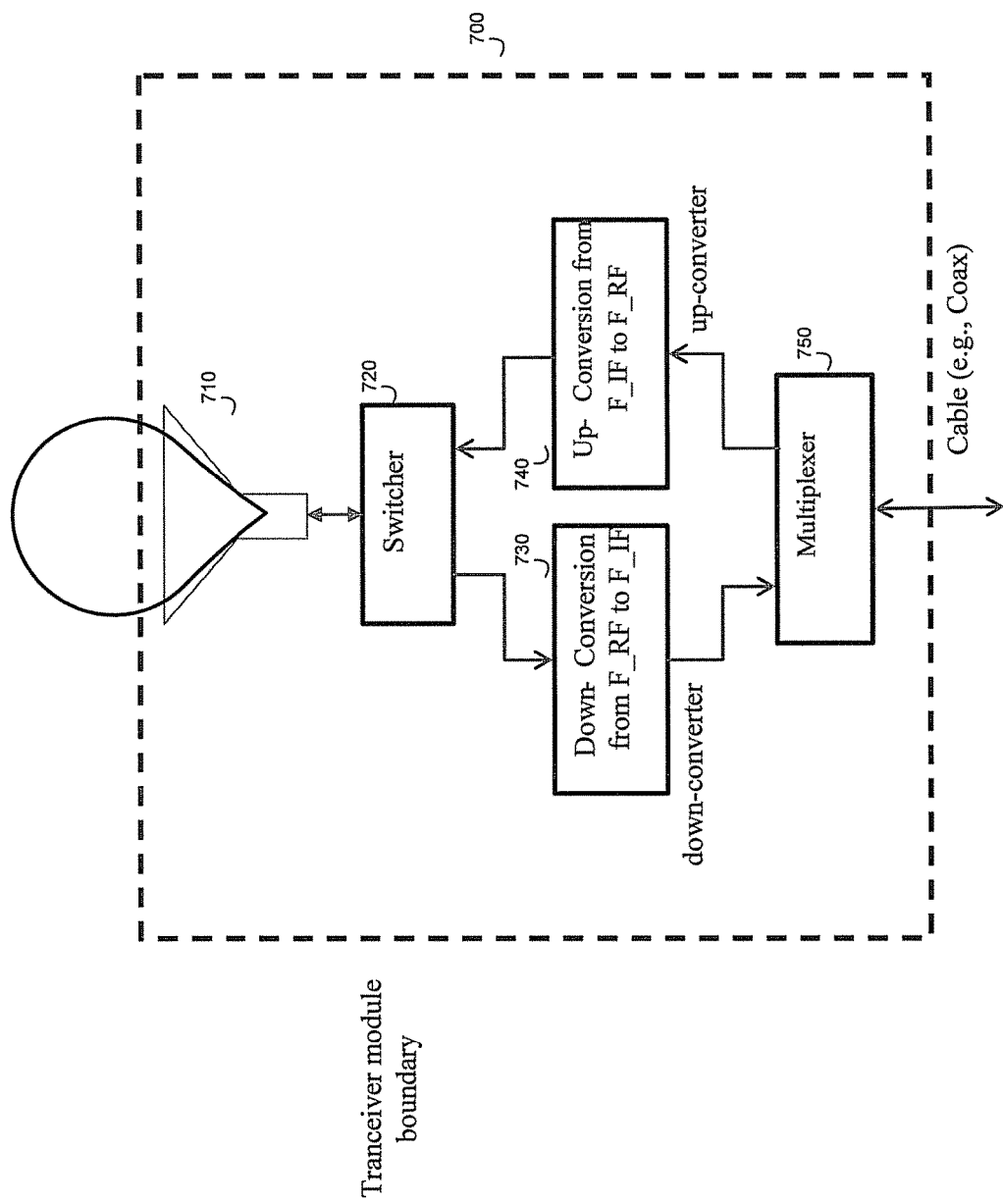
FIG. 7 is a diagram illustrating an exemplary transceiver module with a single antenna that has fixed directionality, in accordance with an embodiment of the invention.

FIG. 7 is a diagram illustrating an exemplary transceiver module with a single antenna that has fixed directionality, in accordance with an embodiment of the invention. Referring to FIG. 7, there is shown a transceiver 700. The transceiver 700 comprises an antenna 710, a switcher 720, a down-converter 730, an up-converter 740, and a multiplexer 750. The down-converter 730, the up-converter 740, and the multiplexer 750 may operate in substantially the same manner as the down-converter 330, the up-converter 340, and the multiplexer 350 in FIG. 3, respectively.

In an exemplary operation, the antenna 710 may have fixed directionality. In this regard, the antenna 710 with fixed directionality may be utilized to generate a fixed beam pattern, which results in the minimized amount of power amplifiers (PAs) and low noise amplifiers (LNAs) in the transceiver 700. The switcher 720 may comprise suitable logic, circuitry, interfaces and/or code that may be operable to switch on or off the transceiver 700. For example, the switcher 720 may be configured or programmed to switch on the transceiver 700 only orientated in the vicinity of the fixed directionality of the antenna 710 for power saving.

Figure 8:
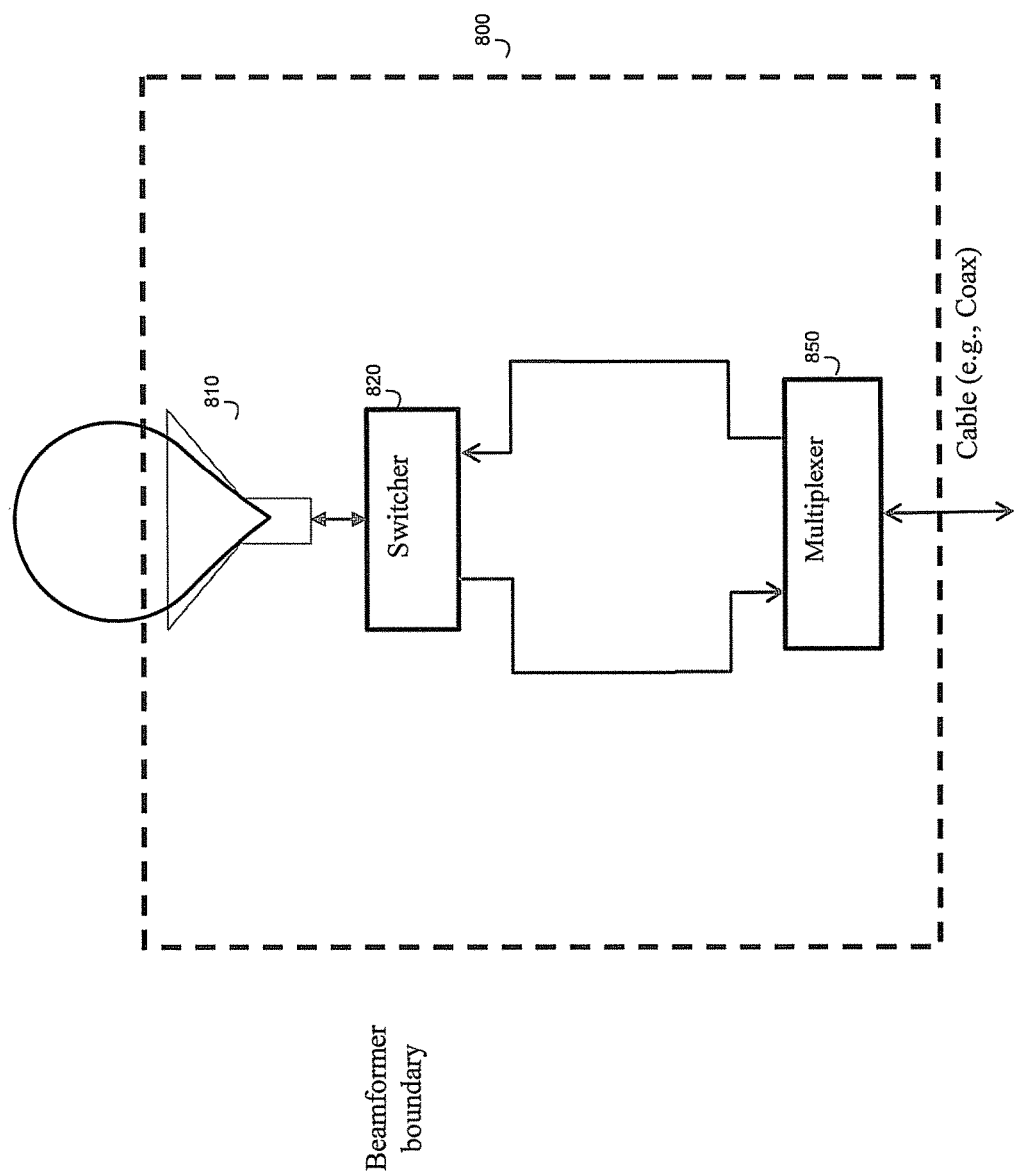
FIG. 8 is a diagram illustrating an exemplary beamformer module with a single antenna that has fixed directionality, in accordance with an embodiment of the invention.

FIG. 8 is a diagram illustrating an exemplary beamformer module with a single antenna that has fixed directionality, in accordance with an embodiment of the invention. Referring to FIG. 8, there is shown a beamformer 800. The beamformer 800 comprises an antenna 810, a switcher 820, and a multiplexer 850. The multiplexer 850 may operate in substantially the same manner as the multiplexer 350 in FIG. 3.

In an exemplary operation, the antenna 810 may have fixed directionality. In this regard, the antenna 810 with fixed directionality may be utilized to generate a fixed beam pattern, which results in the minimized amount of PAs and LNAs in the beamformer 800. The switcher 820 may comprise suitable logic, circuitry, interfaces and/or code that may be operable to switch ON or OFF the beamformer 800. For example, the switcher 820 may be configured or programmed to switch ON the beamformer 800 so that signals are steered and transmitted in the fixed directionality of the antenna 810 for power saving. In some embodiments of the invention, a device may contain beamformers of both FIG. 7 and FIG. 8 types for additional flexibility and programmability.

Figure 9:
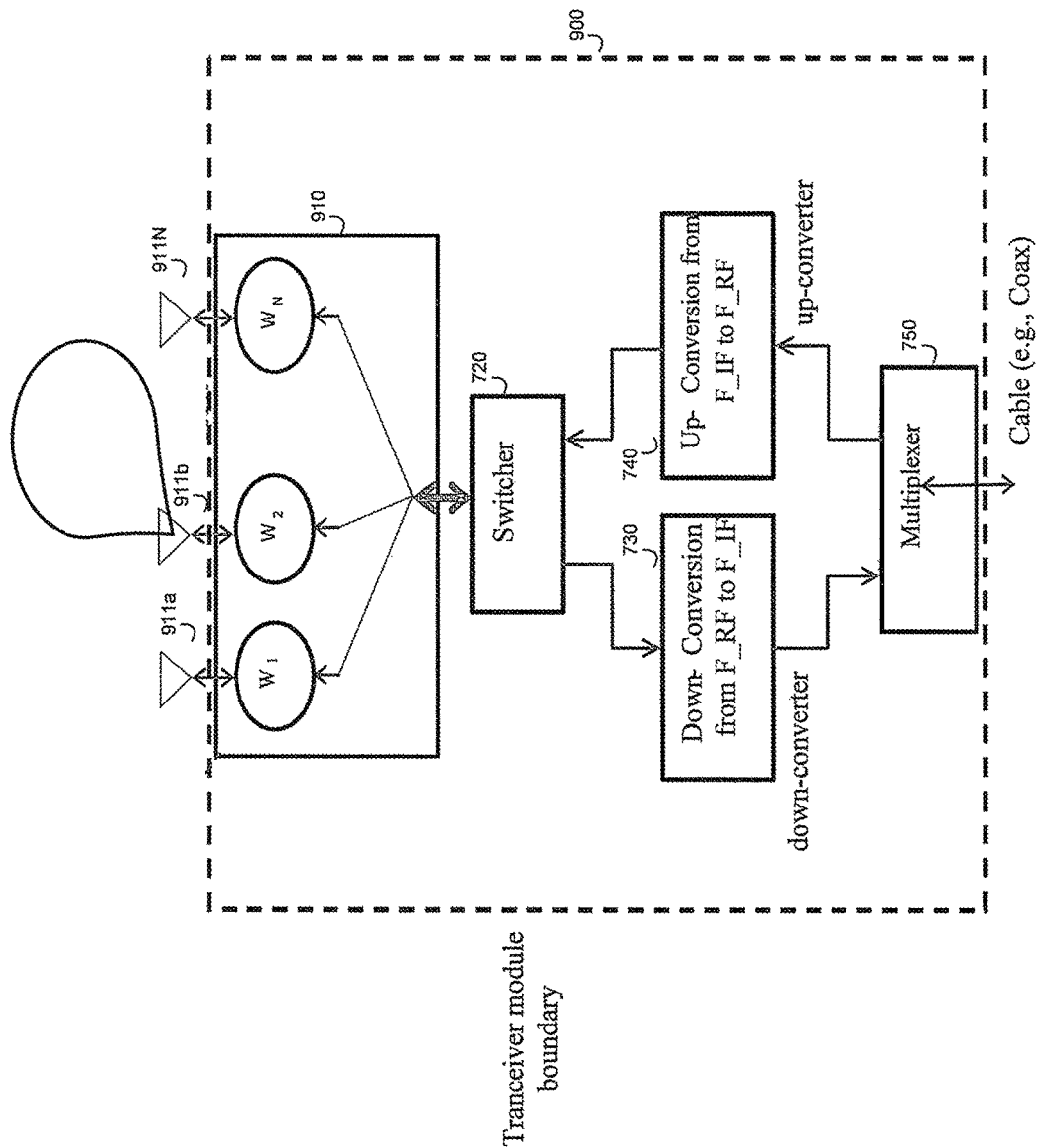
FIG. 9 is a diagram illustrating an exemplary transceiver module with a configurable phased antenna array, in accordance with an embodiment of the invention.

FIG. 9 is a diagram illustrating an exemplary transceiver module with a configurable phased antenna array, in accordance with an embodiment of the invention. As shown, a transceiver 900 that comprises an antenna array 910, the switcher 720, the down-converters 730, the up-converters 740, and the multiplexer 750.

In an exemplary operation, the antenna array 910 may be a configurable phased antenna array. In this regard, the configurable phased antenna array 910 may have various orientations. Accordingly, the configurable phased antenna array 910 may be utilized to generate a steerable beam pattern to maximize coverage. In an exemplary embodiment of the invention, the switcher 720 may be configured to switch on only the antennas that have strong propagation channel responses and are activated. Other antennas may be switched off for power saving. For example, in some instances, the system identifies that antenna 911a of the configurable phased antenna array 910 has the best LOS link to the receiver end (due to blocking objects in the room or nature of reflectors in the room). In this case, only the antenna 911a may be switched on by the switcher 720 to transmit data to the receiver end and all other antennas 911b through 911N of the configurable phased antenna array 910 are switched off for power saving.

Figure 10:
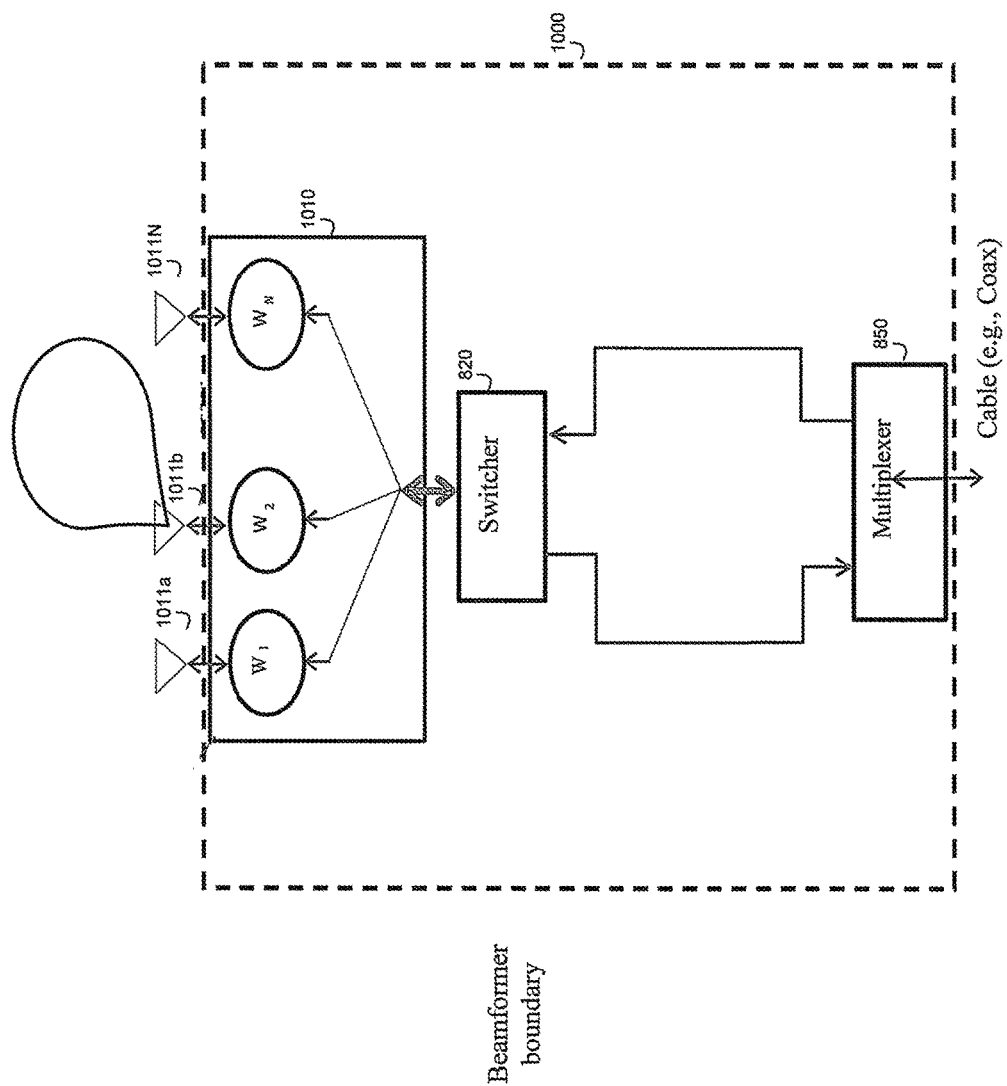
FIG. 10 is a diagram illustrating an exemplary beamformer module with a configurable phased antenna array, in accordance with an embodiment of the invention.

FIG. 10 is a diagram illustrating an exemplary beamformer module with a configurable phased antenna array, in accordance with an embodiment of the invention. Referring to FIG. 10, there is shown a beamformer 1000 that comprises an antenna array 1010, the switcher 820, and the multiplexer 850.

In an exemplary operation, the antenna array 1010 may be a configurable phased antenna array. In this regard, the configurable phased antenna array 1010 may have various orientations. Accordingly, the configurable phased antenna array 1010 may be utilized to generate a steerable beam pattern to maximize coverage. In an exemplary embodiment of the invention, the switcher 820 may be configured to switch ON only the antennas that have strong propagation channel responses and are activated. Other antennas may be switched off for power saving. For example, in some instances, the system may be operable to determine that the antenna 1011a of the configurable phased antenna array 1010 has the best LOS link to the receiver end (due to blocking objects in the room or nature of reflectors in the room). In this case, only the antenna 1011a may be switched on by the switcher 1020 to transmit data to the receiver end and the other antennas 1011b through 1011N of the configurable phased antenna array 1010 are switched off for power saving.

Figure 11:
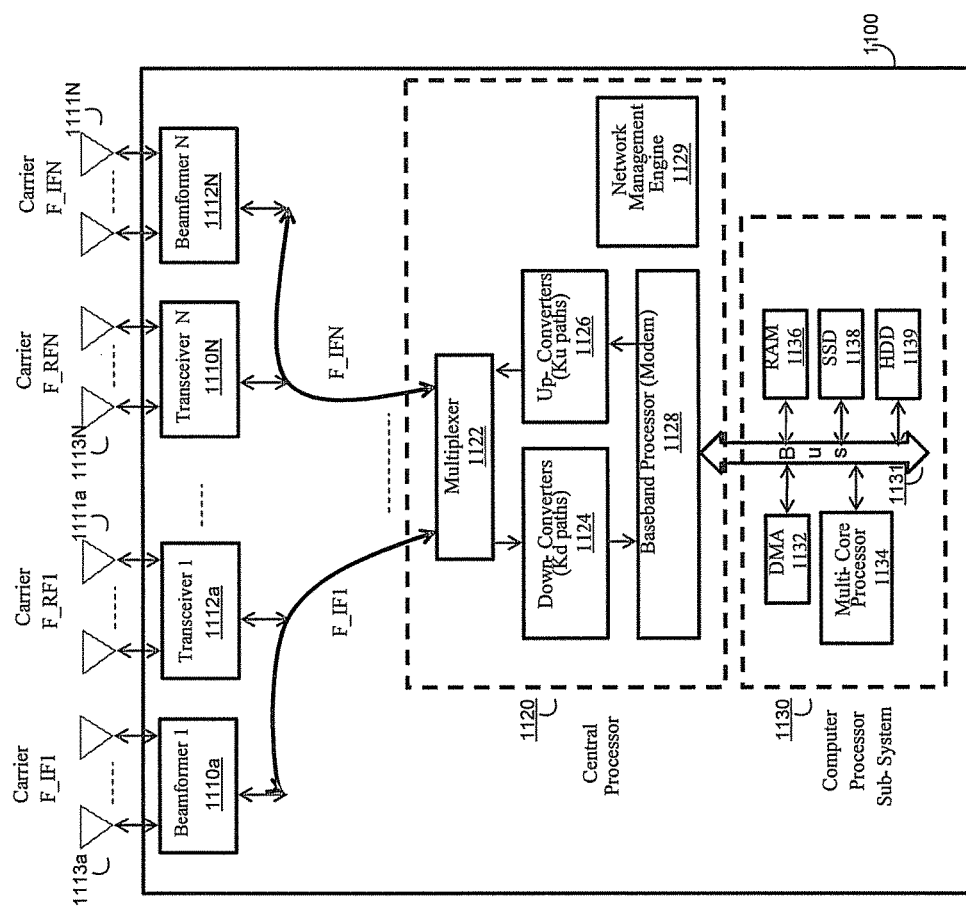
FIG. 11 is a diagram illustrating an exemplary master device that shares associated processing and storage capacities among end-user application devices utilizing high-throughput and low-power communication links, in accordance with an embodiment of the invention.

FIG. 11 is a diagram illustrating an exemplary master device that shares associated processing and storage capacities among end-user application devices utilizing high-throughput and low-power communication links, in accordance with an embodiment of the invention. Referring to FIG. 11, there is shown a master application device 1100 comprising a collection of distributed transceivers 1112a through 1112N, a collection of distributed beamformers 1110a through 1110N, a central processor 1120, and a computer processor sub-system 1130. Each of the distributed transceivers 1112a through 1112N may be coupled (or decoupled in the general usage case) to a corresponding one of the distributed beamformers 1110a through 1110N. Each pair of the distributed transceivers 1112a through 1112N and the corresponding coupled distributed beamformers 1110a through 1110N may be connected to the central processor 1120 within the master application device 1100 utilizing the same communication medium such as cable, for example, a coaxial cable.

The central processor 1120 comprises a multiplexer 1122, down-converters 1124, up-converters 1126, a baseband processor 1128, and a network management engine 1129. The computer processor sub-system 1130 comprises a DMA 1132, a multi-core processor 1134, a RAM 1136, a SSD 1138, and a HDD 1139.

The beamformers 1110a through 1110N, the transceivers 1112a through 1112N, the antenna arrays 1113a through 1113N, the antennas 1111a through 1111N, the multiplexer 1122, the down-converters 1124, the up-converters 1126, the baseband processor 1128, and the network management engine 1129 may operate in substantially the same manner as the beamformers 509a through 509N, the transceivers 510a through 510N, the antenna arrays 512a through 512N, the antenna arrays 513a through 513N, the multiplexer 550, the down-converters 540, the up-converters 546, the baseband processor 520, and the network management engine 530, respectively, as shown, for example in FIG. 5.

In an exemplary embodiment of the invention, the master application device 1100 may be operable to communicate information about available resources such as, for example, various computing sub-modules available in the computer processor sub-system 1130, to other application devices such as the end-user application device 220. The master application device 1100 and the end-user application device 220 may negotiate and determine resources available to be shared each other in various ways. For example, the master application device 1100 may share processing and storage capacities of the end-user application device 220. In this regard, the master application device 1100 may be operable to share available resources of the end-user application device 220 by utilizing RAM capacity on the end-user application device 220 as a virtual RAM. In this regard, heavy computations may be offloaded to the central baseband processor 226 of the end-user application device 220, and SSD/HDD modules in the end-user application device 220 may be utilized for storage or to facilitate data transfer. For example, the master application device 1100 may comprise a special piece of hardware to accelerate audio/video/image processing functions.

The end-user application device 220 may utilize its distributed transceivers 222-224 to connect to the master application device 1100 and share or borrow the special piece of hardware from the master application device 1100 to accelerate audio/video/image processing functions when needed. In another example, the master application device 1100 may comprise sensing and monitoring hardware resources. Such sensing/monitoring of hardware resources may comprise temperature sensors, analog-to-digital converters, and/or pressure sensor. In such cases, the end-user application device 220 may be operable to utilize its distributed transceivers 222-224 to connect to the master application device 1100 and share or borrow the sensing and monitoring hardware resources. In this usage scenario, the transceivers 1112a through 1112N may be utilized to allocate the at least a portion of sensing hardware or resources within the master application device 1100, that is, an analog-to-digital converter, to the end-user application device 220, for example, in real-time. In another example, in instances where the master application device 1100 with a low battery level exploits or identifies an end-user application device such as the end-user application device 220 within close proximity, the master application device 1100 may be operable to establish a high-throughput low-power link using the lower carrier frequencies such as, for example, the 60 GHz frequency spectrum, Bluetooth 2.4 GHz band, and Wi-Fi 802.11 bands, to the end-user application device 220 and to use the processing/communication resources of the end-user application device 220 to establish a link to more distant gateways and/or access points.

The master application device 1100 may be operable to transmit and receive one data stream or multiple data streams to/from the end-user application device 220, for example. For transmission, the baseband processor 1128 may generate transmit signals or data streams at. The transmit signals baseband may be up-converted via the up-converters 1126 to a set of intermediate frequencies, F_IF1 through F_IFN. In an exemplary embodiment of the invention, the central processor 1120 may concurrently route or forward the transmit signals in the set of intermediate frequencies, F_IF1 through F_IFN, to the beamformers 1110a through 1110N and/or the transceivers 1112a through 1112N. In an exemplary embodiment of the invention, the network management engine 1129 may determine or select which transceivers and beamformers within the master application device 1100 may be utilized and at what transmit power levels. In instances where the beamformers 1110a through 1110N are utilized for data transmission, the beamformers 1110a through 1110N may be configured to only perform beamforming and feeding of the transmit signals in the set of intermediate frequencies, F_IF1 through F_IFN, to the antenna arrays 1113a through 1113N without performing frequency up-conversion to a radio frequency band. The transceivers 1112a through 1112N may be turned OFF for saving power during the data transmission through the beamformers 1110a through 1110N. In instances where the transceivers 1112a through 1112N are utilized for data transmission, the transceivers 1112a through 1112N may be operable to perform beamforming in a radio frequency band on the transmit signals for transmission. In this regard, the transceivers 1112a through 1112N may be operable to convert the transmit signals in the set of intermediate frequencies, F_IF1 through F_IFN, to the radio frequency band. The transceivers 1112a through 1112N may pass the transmit signals in the radio frequency band to the antenna arrays 1111a through 1111N for transmission over the air or wirelessly. The beamformers 1110a through 1110N may be turned OFF for saving power during the data transmission through the transceivers 1112a through 1112N. In an exemplary embodiment of the invention, the master application device 1100 may comprise a single transceiver or a single beamformer for simplicity and lower cost. In some embodiments of the invention, a beamformer such as the beamformer 1113a may function just as a feeder to an antenna.

In some embodiments of the invention, parallel data links may be established between the two devices, and each of the data links may be dedicated to a different traffic type. For example, the master application device 1100 may configure three transceivers/beamformers to establish three links (each link potentially with different bandwidth, QoS, latency figures). For example, the baseband processor 1128 may use a low-latency channel coding technique (e.g., shorter block sizes) for one link at the expense of lower performance. At the same time, the baseband processor 1128 may use a high-latency channel coding technique (e.g., longer block sizes) for one link for maximizing that link's throughput and range. By establishing links with different characteristics, the master application device 1100 may then dedicate each link to a different traffic type/category based on the requirement/priority of each traffic type. Low latency traffic (CPU sharing) may be transported exclusively through a low-latency link, while regular Internet-sharing traffic may be transported through a link with higher spectral efficiency (but longer latency). Similarly, memory sharing traffic may be assigned to a third link to avoid any access conflict between CPU and memory sharing traffics.

Figure 12:
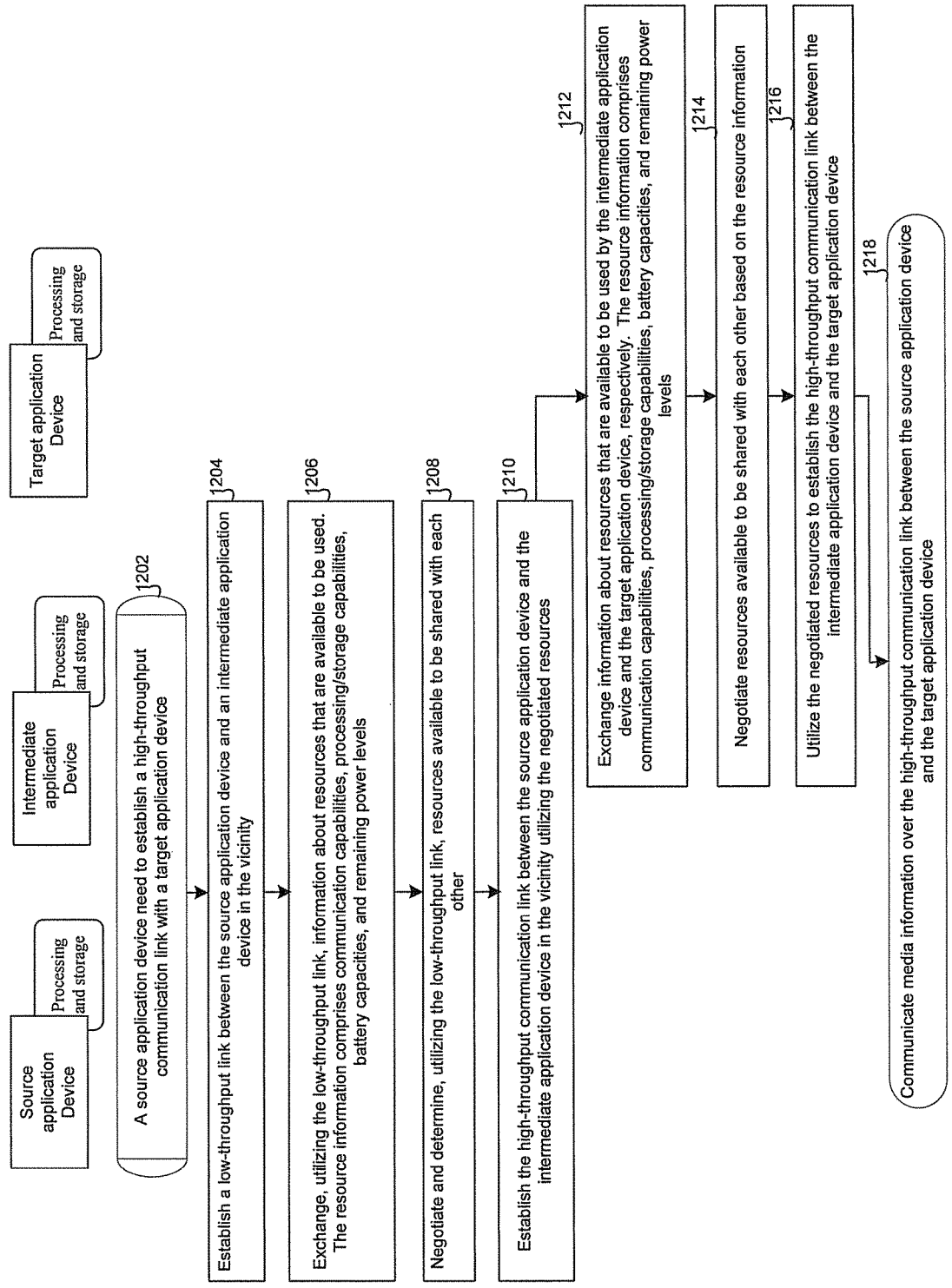
FIG. 12 is a diagram illustrating exemplary steps utilized to establish high-throughput communication links through resource sharing, in accordance with an embodiment of the invention.

FIG. 12 is a diagram illustrating exemplary steps utilized to establish high-throughput communication links through resource sharing, in accordance with an embodiment of the invention. Referring to FIG. 12, in step 1202, a source application device such as the master application device 1100 comprises a collection of distributed transceivers 1111a through 1111N and a collection of distributed beamformers 1113a through 1113N. Each of the distributed transceivers 1111a through 1111N may be coupled to a corresponding one of the distributed beamformers 1113a through 1113N. Each pair of the distributed transceivers 1111a through 1111N and the corresponding coupled distributed beamformers 1113a through 1113N may be coupled to the central processor 1120 within the master application device 1100 utilizing the same communication medium such as cable, for example, coaxial. In some instances, the master application device 1100 may establish a high-throughput communication link with a target application device such as the end-user application device 117 for a desired service such as video and high-speed data in an associated communication network 100.

The communication network 100 comprises a network management engine 1129 that is operable to manage and allocate resources, and control operation of the transceivers and beamformers in the communication network 100. The exemplary steps start with step 1204, where in some instances, the master application device 1100 with a low battery level, for example, may exploit or identify a device such as the end-user application device 220 within close proximity of an intermediate application device. The intermediate application device may be configured to provide assistance to establish the high-throughput communication link between the master application device 1100 and the end-user application device 117 for the desired service. The network management engine 1129 may allocate resources such that the addition of a low-throughput link, which may be established between the master application device 1100 (the source application device) and the end-user application device 220 (the intermediate application device). The low-throughput link may comprise a millimeter wave link, a Bluetooth link, and/or a Wi-Fi link.

In step 1206, the network management engine 1129 may communicate with the master application device 1100 and the end-user application device 220 for resource sharing. In this regard, the master application device 1100 and the end-user application device 220 may utilize the low-throughput link to exchange information about resources that are available to be used. The resource information may comprise communication capabilities, processing/storage capabilities, battery capacities, and remaining power levels available at the master application device 1100 and the end-user application device 220, respectively. In step 1208, the master application device 1100 and the end-user application device 220 may utilize the low-throughput link to negotiate and/or determine resources available to be shared. In step 1210, the network management engine 1129, may manage and allocate resources to the master application device 1100 and the end-user application device 220, respectively, base on the negotiated resources. The high-throughput communication link between the master application device 1100 and the end-user application device 220 may be established utilizing the negotiated resources.

In step 1212, the network management engine 1129 may communicate with the end-user application device 220 (the intermediate application device) and the end-user application device 117 (the target application device) for resource sharing. In this regard, the end-user application device 220 and the end-user application device 117 may exchange information about resources that are available to be used. In an exemplary embodiment of the invention, the resources that are available to be used at the end-user application device 220 (the intermediate application device) may comprise the actual resources of the end-user application device 220 and the virtual resources supplied from other application devices such as the master application device 1100. In step 1214, the end-user application device 220 and the end-user application device 117 may negotiate and/or determine resources available to be shared.

In step 1216, the network management engine 1129 may configure the distributed transceivers 1111a through 1111N and the corresponding coupled distributed beamformers 1113a through 1113N, and allocate resources to the end-user application device 220 and the end-user application device 117, respectively, based on the negotiated resources. The high-throughput communication link between the end-user application device 220 (the intermediate application device) and the end-user application device 117 (the target application device) may be established utilizing the negotiated resources. In step 1218, the network management engine 1129 may coordinate operations of the master application device 1100 (the source application device), the end-user application device 220 (the intermediate application device) and the end-user application device 117 (the target application device) to communicate media information of the desired service over the high-throughput communication link between the master application device 1100 (the source application device) and the end-user application device 117 (the target application device).

Figure 13:
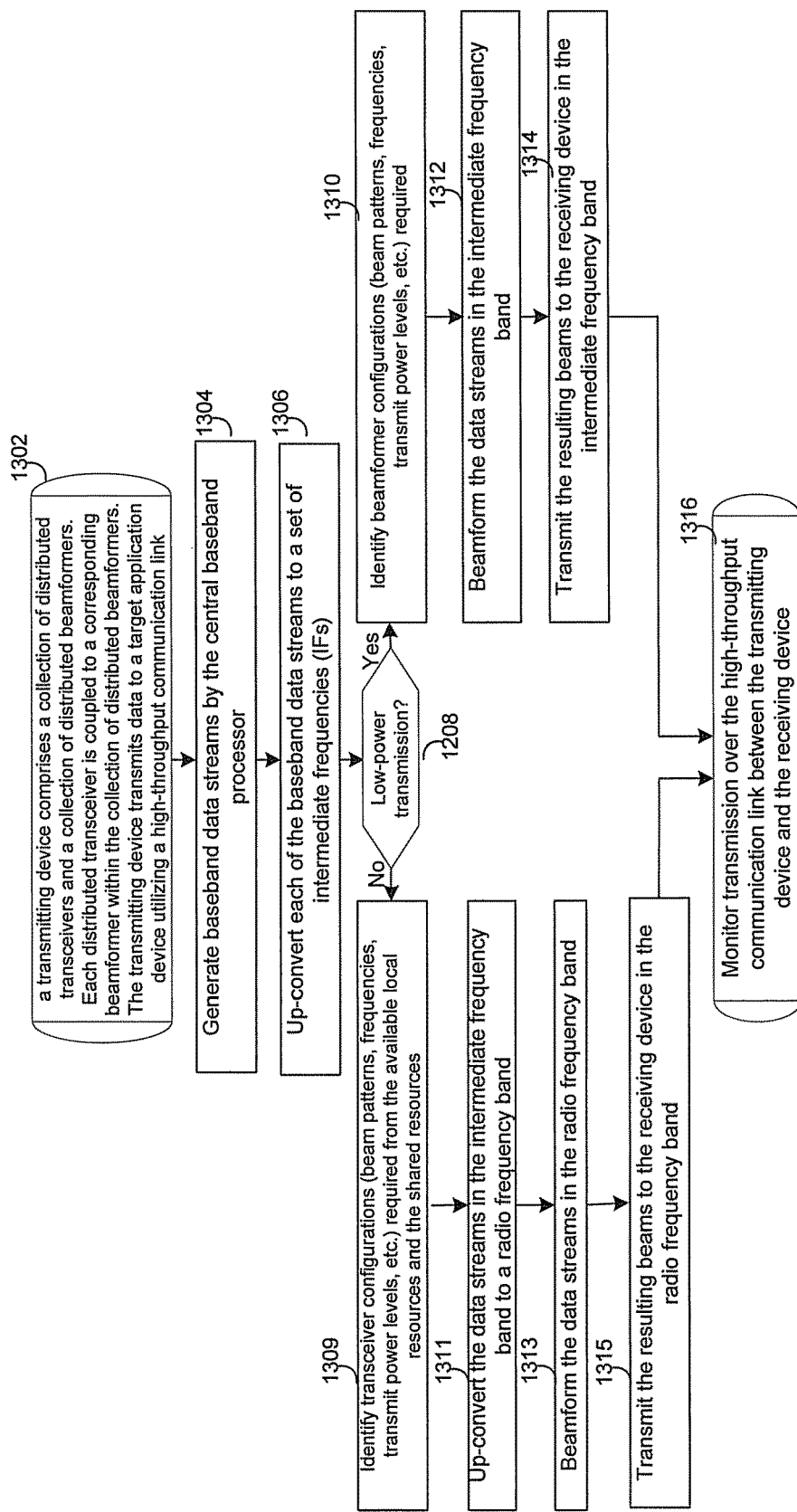
FIG. 13 is a diagram illustrating exemplary steps utilized to establish high-throughput and low-power communication links utilizing distributed beamformers, in accordance with an embodiment of the invention.

FIG. 13 is a diagram illustrating exemplary steps utilized to establish high-throughput and low-power communication links utilizing distributed beamformers, in accordance with an embodiment of the invention. Referring to FIG. 13, in step 1302, a transmitting device such as the master application device 1100 comprises a collection of distributed transceivers 1111a through 1111N and a collection of distributed beamformers 1113a through 1113N. Each of the distributed transceivers 1111a through 1111N may be coupled to a corresponding one of the distributed beamformers 1113a through 1113N. Each pair of the distributed transceivers 1111a through 1111N and the corresponding coupled distributed beamformers 1113a through 1113N may be connected to the central processor 1120 within the master application device 1100 utilizing the same communication medium such as cable. A high-throughput communication link may be established between the master application device 1100 (the transmitting device) and a target application device such as the end-user application device 220 for a desired service such as video and high speed data.

The exemplary steps start with step 1304, where the baseband processor 1128 may be operable to generate a data stream at the baseband for transmission. In step 1306, the generated data stream, at baseband, may be up-converted to a set of intermediate frequencies, F_IF1 through F_IFN. The resulting data streams in the set of intermediate frequencies, F_IF1 through F_IFN, may be concurrently routed or forwarded to the distributed transceivers 1111a through 1111N and the corresponding coupled distributed beamformers 1113a through 1113N. In step 1308, it may be determined by the network management engine 1129 whether low-power transmission may be required. In instances where the low-power transmission may be required for the transmission of the data streams utilizing the set of intermediate frequencies, F_IF1 through F_IFN, then in step 1310, the network management engine 1129 may determine or identify beamformer configurations such as, for example, beam patterns, frequencies, and/or transmit power levels required.

In step 1312, the collection of distributed beamformers 1113a through 1113N may be configured by the network management engine 1129 utilizing the determined beamformer configurations. The collection of distributed beamformers 1113a through 1113N may perform beamforming on the data streams in the set of intermediate frequencies, F_IF1 through F_IFN. In step 1314, the collection of distributed beamformers 1113a through 1113N may transmit the resulting beams, utilizing the set of intermediate frequencies, F_IF1 through F_IFN, to the end-user application device 220 (the target application device). The exemplary steps may continue at step 1316, where the network management engine 1129 may monitor the data transmission over the high-throughput communication link between the master application device (the transmitting device) and the end-user application device 220 (the target application device).

In step 1308, in instances where the low-power transmission is not required for the transmission of the data streams utilizing the set of intermediate frequencies, F_IF1 through F_IFN, then in step 1309, the network management engine 1129 may determine or identify transceiver configurations such as, for example, beam patterns, frequencies, and/or transmit power levels required. In step 1311, the collection of the distributed transceivers 1111a through 1111N may be configured by the network management engine 1129 utilizing the determined transceiver configurations. The distributed transceivers 1111a through 1111N may be operable to up-convert the data streams to the set of intermediate frequencies, F_IF1 through F_IFN to a radio frequency band. In step 1313, the transceivers 1112a through 1112N may perform beamforming on the data streams in the radio frequency band. In step 1315, the collection of distributed transceivers 1112a through 1112N may transmit the resulting beams in the radio frequency band to the end-user application device 220 (the target application device). The exemplary steps may continue in step 1316.

Aspects of a method and system for high-throughput and low-power communication links in a distributed transceiver network are provided. In accordance with various exemplary embodiments of the invention, as described with respect to FIG. 1 through FIG. 13, a device such as the master application device 1110 comprises the plurality of distributed transceivers 1111a-1111N, the plurality of distributed beamformers 1113a-1113N, the baseband processor 1128, and the network management engine 1129. The plurality of distributed transceivers 1111a-1111N may be operable to perform beamforming in a radio frequency band, and the plurality of distributed beamformers 1113a-1113N, however, may perform beamforming in an intermediate frequency band. Each of the distributed transceivers 1111a-1111N may be coupled to a corresponding one of the distributed beamformers 1113a-1113N. Each pair of the distributed transceivers 1111a-1111N and the corresponding coupled distributed beamformers 1113a-1113N may be connected to the baseband processor 1128 within the master application device 1100 utilizing a communication medium such as cable, for example, thin coaxial cable. For transmission, the baseband processor 1128 may be operable to generate a data stream or signal at baseband such as a cellular baseband.

The up-converters 1126 of the central processor 1120 within the master application device 1100 may be operable to convert the data stream, which are at baseband, to one or more intermediate frequencies, F_IF1 through F_IFN, within the intermediate frequency band. The central processor 1120 may concurrently route or forward the data stream in the one or more intermediate frequencies, F_IF1 through F_IFN, to the distributed transceivers 1112a-1112N and the distributed beamformers 1110a-1110N. In instances where a low-power transmission is required, the network management engine 1129 may configure the master application device 1100 to utilize the distributed beamformers 1113a-1113N to transmit the data stream wirelessly in the intermediate frequencies, F_IF1 through F_IFN, to a receiving device such as the end-user application device 220. In this regard, each of the distributed beamformers 1110a-1110N may only perform beamforming and feeding of the data stream in the intermediate frequencies, F_IF1 through F_IFN, to the corresponding antenna arrays 1113a-1113N for transmission over the air or wirelessly without performing frequency up-conversion to a radio frequency.

The use of the distributed beamformers 1110a-1110N may enable the master application device 1100 to transmit the data stream in the intermediate frequencies, F_IF1 through F_IFN, to the end-user application device 220. This may result in significantly lower propagation loss compared to RF frequency propagation.

In instances where low-power transmission is not required, the network management engine 1129 may configure the master application device 1100 to utilize the distributed transceivers 1112a through 1112N to transmit the data stream to the end-user application device 220. Each of the distributed transceivers 1112a through 1112N may be operable to perform beamforming in the radio frequency band on the data stream for transmission. In this regard, each of the distributed transceivers 1112a-1112N may be operable to convert the data stream in the corresponding intermediate frequencies, F_IF1 through F_IFN, to the radio frequency band utilizing the up-converter 340. The distributed transceivers 1112a-1112N may pass the resulting data streams in the radio frequency to the corresponding antenna arrays 1111a through 1111N for transmission over the air or wirelessly to the end-user application device 220.

A high-throughput communication link may be established between the master application device 1100 and the end-user application device 220 through resource sharing to support data transmission of a desired service. In this regard, the master application device 1100 may be configured to utilize a low-throughput link, established between the master application device 1100 and the end-user application device 220, to exchange information about resources that are available to be used or shared. The low-throughput link may comprise a millimeter wave link, a Bluetooth link, and/or a Wi-Fi link. The exchanged resource information may comprise communication capabilities, processing and storage capabilities, battery capacities, and remaining battery power levels available at the master application device 1100 and the end-user application device 220, respectively. The master application device 1100 and the end-user application device 220 may utilize the low-throughput link to negotiate resources available to be shared for the data transmission of the desired service. The network management engine 1129 may configure the distributed transceivers 1111a-1111N and the corresponding coupled distributed beamformers 1113a-1113N based on the resource sharing negotiation. The network management engine 1129 may manage and allocate resources based on the resource sharing negotiation such that a high-throughput and low-power communication link may be established between the master application device 1100 and the end-user application device 220 to facilitate the data transmission. The master application device 1100 may be configured to turn OFF the distributed transceivers 1111a through 1111N to save power while the distributed beamformers 1113a through 1113N are utilized to transmit the data stream in the intermediate frequencies, F_IF1 through F_IFN, to the end-user application device 220. The master application device 1100 may be configured to turn OFF the distributed beamformers 1113a through 1113N to save power while the distributed transceivers 1111a through 1111N are utilized to transmit the data stream in the radio frequency to the end-user application device 220.

In some instances, the master application device 1100 with a low battery level may exploit or identify a device such as the end-user application device 220 within close proximity with available processing and/or communication resources. The master application device 1100 may be operable to establish a high-throughput and low-power communication link using lower carrier frequencies such as, for example, the 60 GHz frequency spectrum, Bluetooth 2.4 GHz band, and Wi-Fi 802.11 bands, to the end-user application device 220 and to use the available processing and communication resources of the end-user application device 220 to establish a link to more distant application devices such as gateways and/or access points.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for high-throughput and low-power communication links in a distributed transceiver network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
   in a first device comprising (i) a plurality of distributed beamformers, each distributed beamformer comprising an antenna array comprising a plurality of antennas and (ii) a plurality of baseband processors, each baseband processor associated with a different set of distributed beamformers in the plurality of distributed beamformers;
   generating, at baseband, a different data stream in a plurality of data streams by each of the plurality of baseband processors;
   converting the plurality of data streams at baseband to a set of intermediate frequencies within an intermediate frequency band; and
   transmitting the different data stream generated by each particular baseband processor wirelessly at said set of intermediate frequencies to a second device through the antenna arrays of the set of distributed beamformers corresponding to the particular baseband processor.

2. The method of claim 1, wherein each beamformer performs beamforming in the intermediate frequency band without up-converting the signals to a radio frequency band.

3. The method of claim 2, the first device further comprising a plurality of distributed transceivers for performing beamforming in a radio frequency band, each of the plurality of distributed transceivers coupled to a corresponding one of the plurality of distributed beamformers, each of the plurality of distributed transceivers and the corresponding coupled distributed beamformer connected to a same corresponding baseband processor from the plurality of baseband processors, the method further comprising:
   identifying a set of capabilities of the first and second devices;
   turning on a set of distributed transceivers in the plurality of distributed transceivers of the first device based on the identified capabilities; and
   converting, by each distributed transceiver in the set of distributed transceivers, the data stream generated by the corresponding baseband processor to said radio frequency band.

4. The method of claim 3, wherein the identified capabilities of each of the first and second devices comprise one or more of a battery life, a number of transceivers, a number of antennas per transceiver, a number of beamformers, a number of antennas per beamformer, device interface types, a maximum transmit power, processing protocols, service types, service classes, service requirements, storage capabilities, and a remaining power level.

5. The method of claim 3 further comprising transmitting, by each distributed transceiver in the set of distributed transceivers, the corresponding converted data stream at said radio frequency band to the second device.

6. The method of claim 5, further comprising turning off a set of beamformers corresponding to the set of distributed transceivers during the transmitting of said data stream through the antenna arrays of the set of distributed transceivers.

7. The method of claim 6 further comprising determining that a low-power communication link is not required between the first and second devices based on the identified set of capabilities, wherein turning on the set of distributed transceivers and turning off the set of distributed beamformers are based on the determination that a low-power link is not required between the first and second devices.

8. The method of claim 1, the first device further comprising a plurality of distributed transceivers for performing beamforming in a radio frequency band, each of the plurality of distributed transceivers coupled to a corresponding one of the plurality of distributed beamformers, each of the plurality of distributed transceivers and the corresponding coupled distributed beamformer connected to a same corresponding baseband processor from the plurality of baseband processors, the method further comprising:
   identifying a set of capabilities of the first and second devices; and
   turning off the plurality of distributed transceivers of the first device based on the identified capabilities while transmitting the plurality of data streams using the plurality of distributed beamformers.

9. The method of claim 8 further comprising determining that a low-power communication link is required between the first and second devices based on the identified set of capabilities, wherein turning off the set of distributed transceivers and transmitting the plurality of data streams using the plurality of distributed beamformers are based on the determination that a low-power link is required between the first and second devices.

10. The method of claim 8 further comprising identifying a set of communication environment information, wherein turning off the plurality of distributed transceivers and transmitting the plurality of data streams using the plurality of distributed beamformers are further based on the identified set of communication environment information.

11. The method of claim 10, wherein the identified set of communication environment information comprises one or more of propagation environment conditions, a link quality, device capabilities, antennas polarization, radiation patterns, antennas spacing, antenna arrays geometry, device locations, target throughput, quality of service (QoS) requirements, and transmitter and receiver locations.

12. The method of claim 1, wherein the intermediate frequency band comprises 60 GHz frequency range, the method further comprising transmitting the plurality of data streams in mmWave.

13. The method of claim 1, wherein the plurality of distributed beamformers is a first plurality of distributed beamformers, wherein first device further comprises a processor and a second plurality of distributed beamformers, wherein each distributed beamformer in the second plurality of distributed beamformers comprises an antenna array comprising a plurality of antennas, the method further comprising:
  sending, from the processor, a corresponding different data stream in the intermediate frequency band to each distributed beamformer in the second plurality of distributed beamformers; and
  transmitting the corresponding different data stream at the intermediate frequency band from the antenna array of each beamformer in the second plurality of beamformers to the second device through the antenna arrays.

14. A communication device comprising:
  a plurality of distributed beamformers, each distributed beamformer comprising an antenna array comprising a plurality of antennas; and
  a plurality of baseband processors, each baseband processor associated with a different set of distributed beamformers in the plurality of distributed beamformers;
  each baseband processor configured to:
    generate, at baseband, a different data stream in a plurality of data streams; and
    convert the plurality of data streams at baseband to a set of intermediate frequencies within an intermediate frequency band; and
  the antenna arrays of the set of distributed beamformers corresponding to each particular baseband processor configured to transmit the different data stream generated by the particular baseband processor wirelessly at said set of intermediate frequencies to a destination device.

15. The communication device of claim 14, wherein each beamformer is configured to perform beamforming in the intermediate frequency band without up-converting the signals to a radio frequency band.

16. The communication device of 14 further comprising:
  a network management engine; and
  a plurality of distributed transceivers for performing beamforming in a radio frequency band, each of the plurality of distributed transceivers coupled to a corresponding one of the plurality of distributed beamformers, each of the plurality of distributed transceivers and the corresponding coupled distributed beamformer connected to a same corresponding baseband processor from the plurality of baseband processors;
  the network management engine configured to:
    identify a set of capabilities of the communication device and the destination device; and
    turn on a set of distributed transceivers in the plurality of distributed transceivers of the communication device based on the identified capabilities; and
  each distributed transceiver in the set of distributed transceivers configured to convert the data stream generated by the corresponding baseband processor to said radio frequency band.

17. The communication device of claim 16, wherein the identified capabilities of each of the communication device and the destination device comprise one or more of a battery life, a number of transceivers, a number of antennas per transceiver, a number of beamformers, a number of antennas per beamformer, device interface types, a maximum transmit power, processing protocols, service types, service classes, service requirements, storage capabilities, and a remaining power level.

18. The communication device of claim 16, each distributed transceiver in the set of distributed transceivers configured to transmit the corresponding converted data stream at said radio frequency band to the destination device.

19. The communication device of claim 18, the network management engine configured to turn off a set of beamformers corresponding to the set of distributed transceivers during the transmitting of said data stream through the antenna arrays of the set of distributed transceivers.

20. The communication device of claim 19, the network management engine configured to determine that a low-power communication link is not required between the communication device and the destination device based on the identified set of capabilities, wherein turning on the set of distributed transceivers and turning off the set of distributed beamformers are based on the determination that a low-power link is not required between the communication device and the destination device.

21. The communication device of claim 15 further comprising:
  a network management engine; and
  a plurality of distributed transceivers for performing beamforming in a radio frequency band, each of the plurality of distributed transceivers coupled to a corresponding one of the plurality of distributed beamformers, each of the plurality of distributed transceivers and the corresponding coupled distributed beamformer connected to a same corresponding baseband processor from the plurality of baseband processors;
  the network management engine configured to:
    identify a set of capabilities of the communication device and the destination device; and
    turn off the plurality of distributed transceivers of the communication device based on the identified capabilities while transmitting the plurality of data streams using the plurality of distributed beamformers.

22. The communication device of claim 21, the network management engine configured to determine that a low-power communication link is required between the communication device and the destination device based on the identified set of capabilities,
   wherein turning off the set of distributed transceivers and transmitting the plurality of data streams using the plurality of distributed beamformers are based on the determination that a low-power link is required between the communication device and the destination device.

23. The communication device of claim 21, the network management engine configured to identify a set of communication environment information, wherein turning off the plurality of distributed transceivers and transmitting the plurality of data streams using the plurality of distributed beamformers are further based on the identified set of communication environment information.

24. The communication device of claim 23, wherein the identified set of communication environment information comprises one or more of propagation environment conditions, a link quality, device capabilities, antennas polarization, radiation patterns, antennas spacing, antenna arrays geometry, device locations, target throughput, quality of service (QoS) requirements, and transmitter and receiver locations.

25. The communication device of claim 14, wherein the intermediate frequency band comprises 60 GHz frequency range, wherein the antenna arrays of the set of distributed beamformers transmit the plurality of data streams in mmWave.

26. The communication device of claim 14, wherein the plurality of distributed beamformers is a first plurality of distributed beamformers, the communication device further comprising:
   a second plurality of distributed beamformers, each distributed beamformer in the second plurality of distributed beamformers comprising an antenna array comprising a plurality of antennas; and
   a processor configured to send a different data stream in the intermediate frequency band to each distributed beamformer in the second plurality of distributed beamformers;
   wherein the antenna arrays of each distributed beamformer in the second plurality of distributed beamformers is configured to:
      receive the corresponding different data stream from the processor; and
      transmit the corresponding different data stream wirelessly in the intermediate frequency band to the destination device.

* * * * *